United States Patent [19]
Shimokawa

[11] Patent Number: 5,919,250
[45] Date of Patent: *Jul. 6, 1999

[54] DATA TRANSMISSION SYSTEM USED FOR PLANT CONTROL AND BASED ON LOCAL AREA NETWORK

[75] Inventor: Yoshiyuki Shimokawa, Tokyo, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,160

[22] Filed: May 10, 1996

[30] Foreign Application Priority Data

May 12, 1995 [JP] Japan .................................... 7-114724

[51] Int. Cl.[6] .............................. G06F 13/38; G06F 15/17
[52] U.S. Cl. ........................... 709/252; 709/250; 370/466; 370/463
[58] Field of Search ......................... 395/200.17, 200.37, 395/200.66, 200.82, 200.8; 370/408, 406, 447, 461, 402, 445, 462, 465, 466, 469, 463

[56] References Cited

U.S. PATENT DOCUMENTS

| | | | |
|---|---|---|---|
| 4,063,220 | 12/1977 | Metcalfe et al. ........................ | 340/147 |
| 4,543,630 | 9/1985 | Neches ............................... | 395/200.37 |
| 4,819,229 | 4/1989 | Pritty ........................................... | 370/89 |
| 4,885,742 | 12/1989 | Yano ....................................... | 370/85.2 |
| 4,930,121 | 5/1990 | Shiobara ................................ | 370/85.4 |
| 5,018,139 | 5/1991 | Despres .................................. | 370/94.3 |
| 5,353,284 | 10/1994 | Shiobara ................................... | 370/85 |
| 5,519,709 | 5/1996 | Albrecht ................................. | 370/408 |

OTHER PUBLICATIONS

Kadambi, 100VG–AnyLAN: Network Operation and Real–Time Capabilities, IEEE, 1994.
IEEE Standards for Local and Metropolitan Are Networks (802.12) Sections 1, 6, 7 and 10, Jan. 1995.
Watson, Albrecht, The Demand Priority MAC Protocol, IEEE Network, Jan. 1995.

*Primary Examiner*—Mark H. Rinehart
*Attorney, Agent, or Firm*—Oblon, Spivak, McClelland, Maier & Neustadt, P.C.

[57] ABSTRACT

In a data transmission system, a plurality of control terminals or nodes used for plant control are connected to each other through a known LAN such as an ETHERNET, and a large number of control data are transmitted between the nodes at a high speed. When control data generated by each node is to be transmitted to another node, an ETHERNET frame is used as a transmission frame, and at least a plurality of blocked control data are stored on the ETHERNET frame. The control data is periodically transmitted in a multicast manner, each node includes a control data memory, and the control data is transmitted by using the memory.

15 Claims, 11 Drawing Sheets

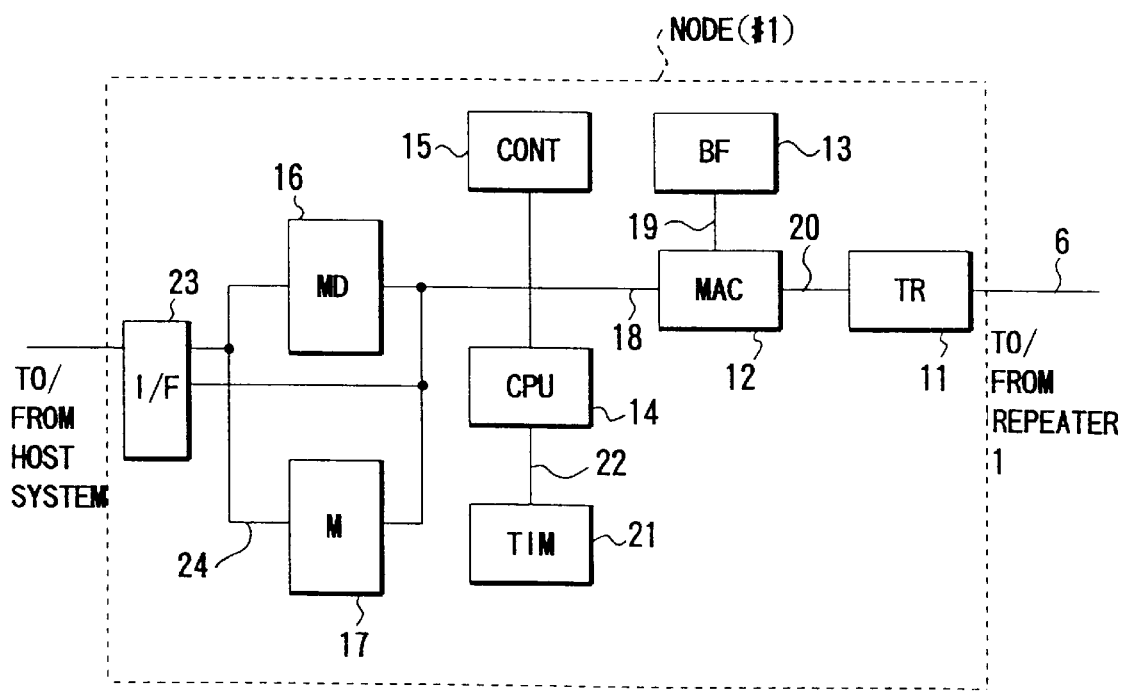
F I G. 3

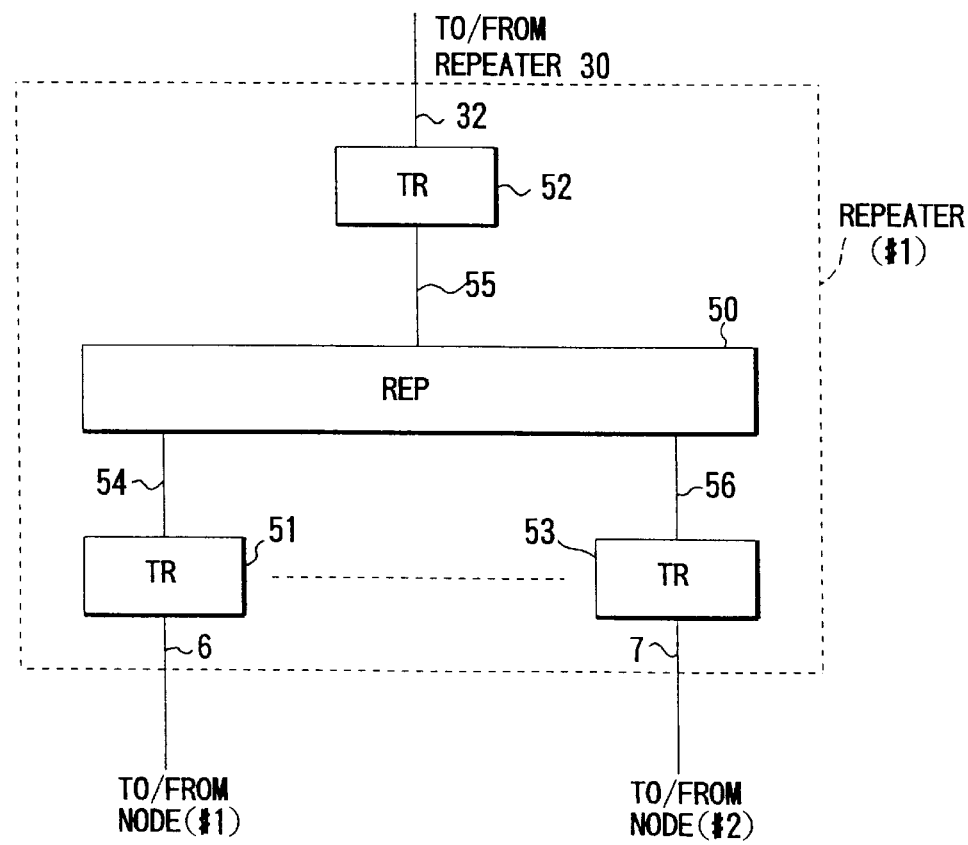
F I G. 9

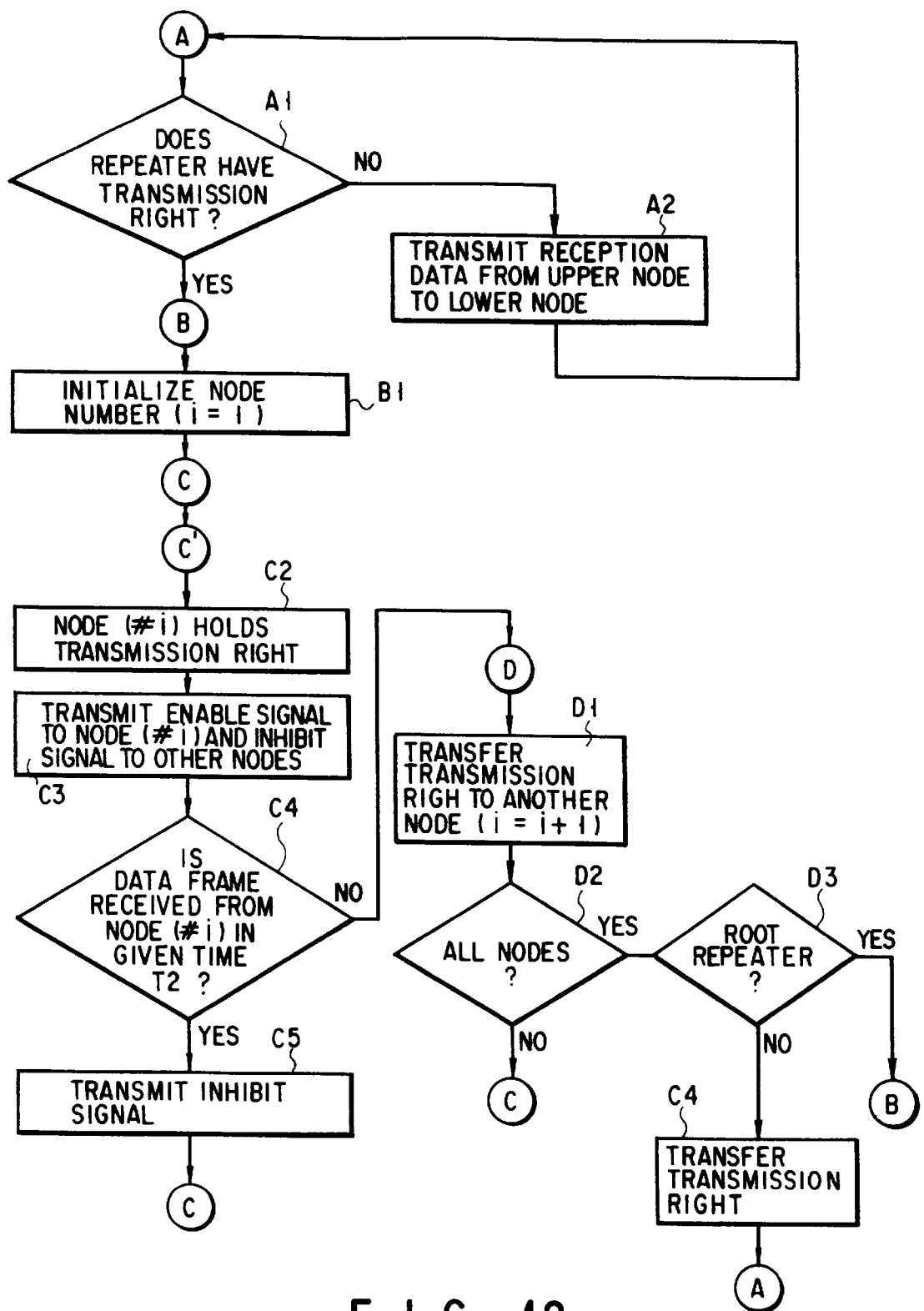
F I G. 12

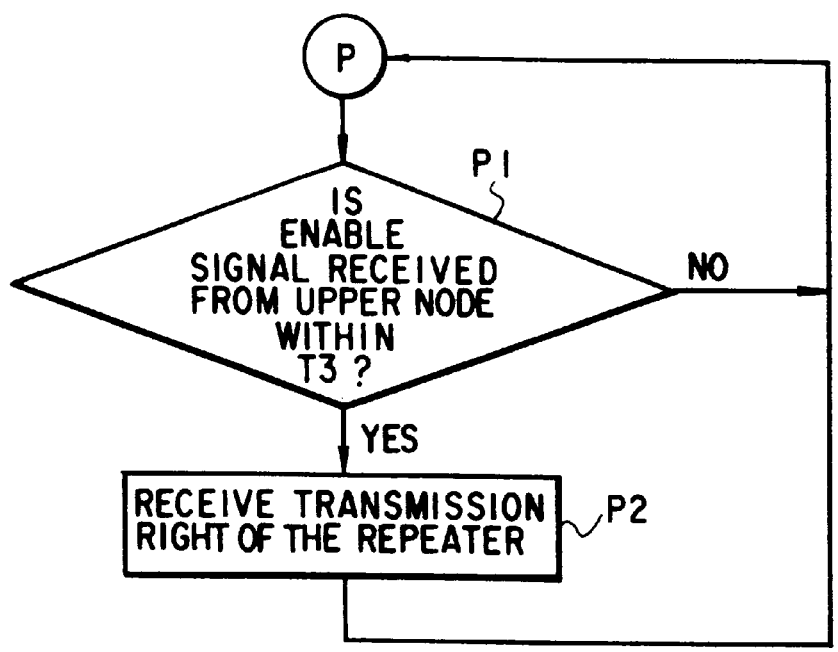
F I G. 13
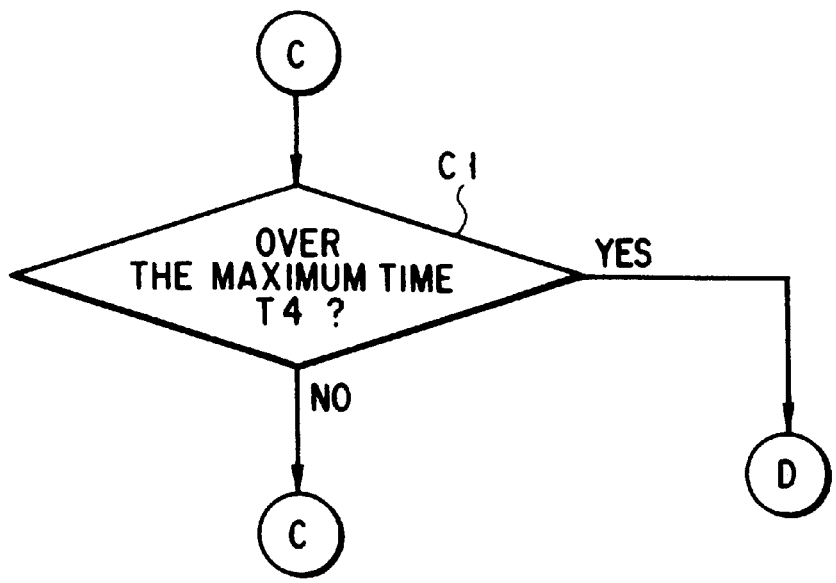
F I G. 14

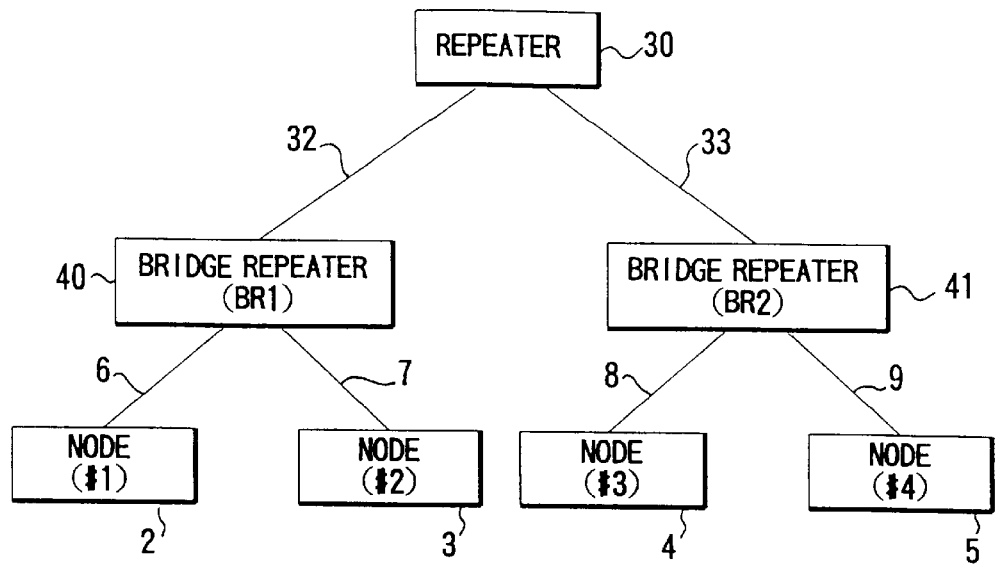
F I G. 15
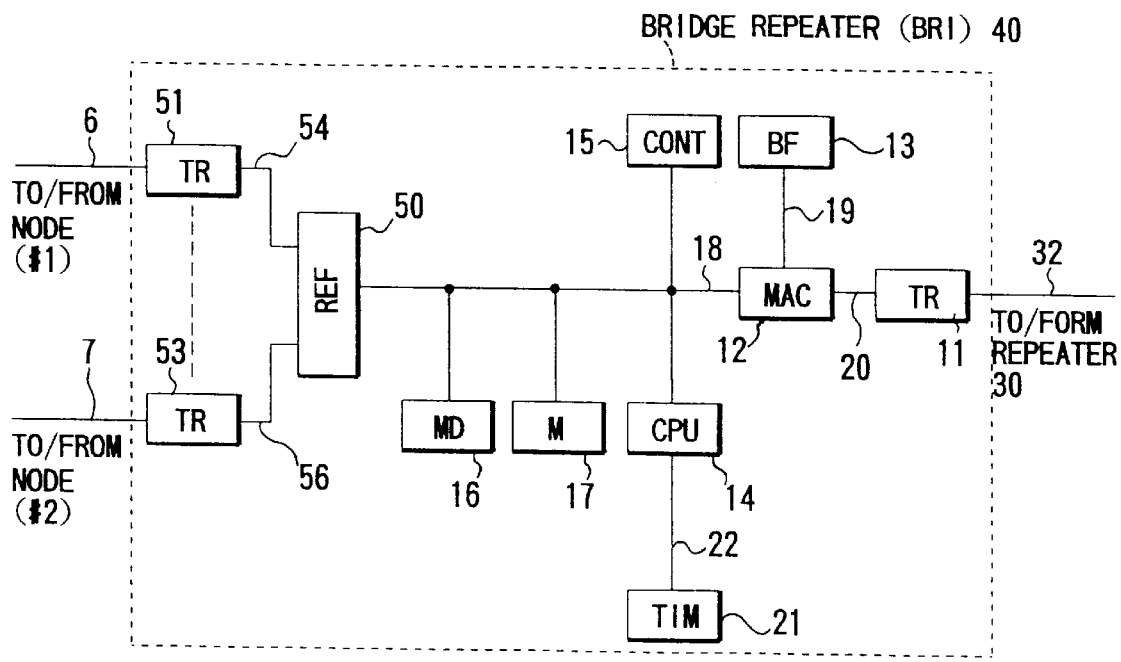
F I G. 16

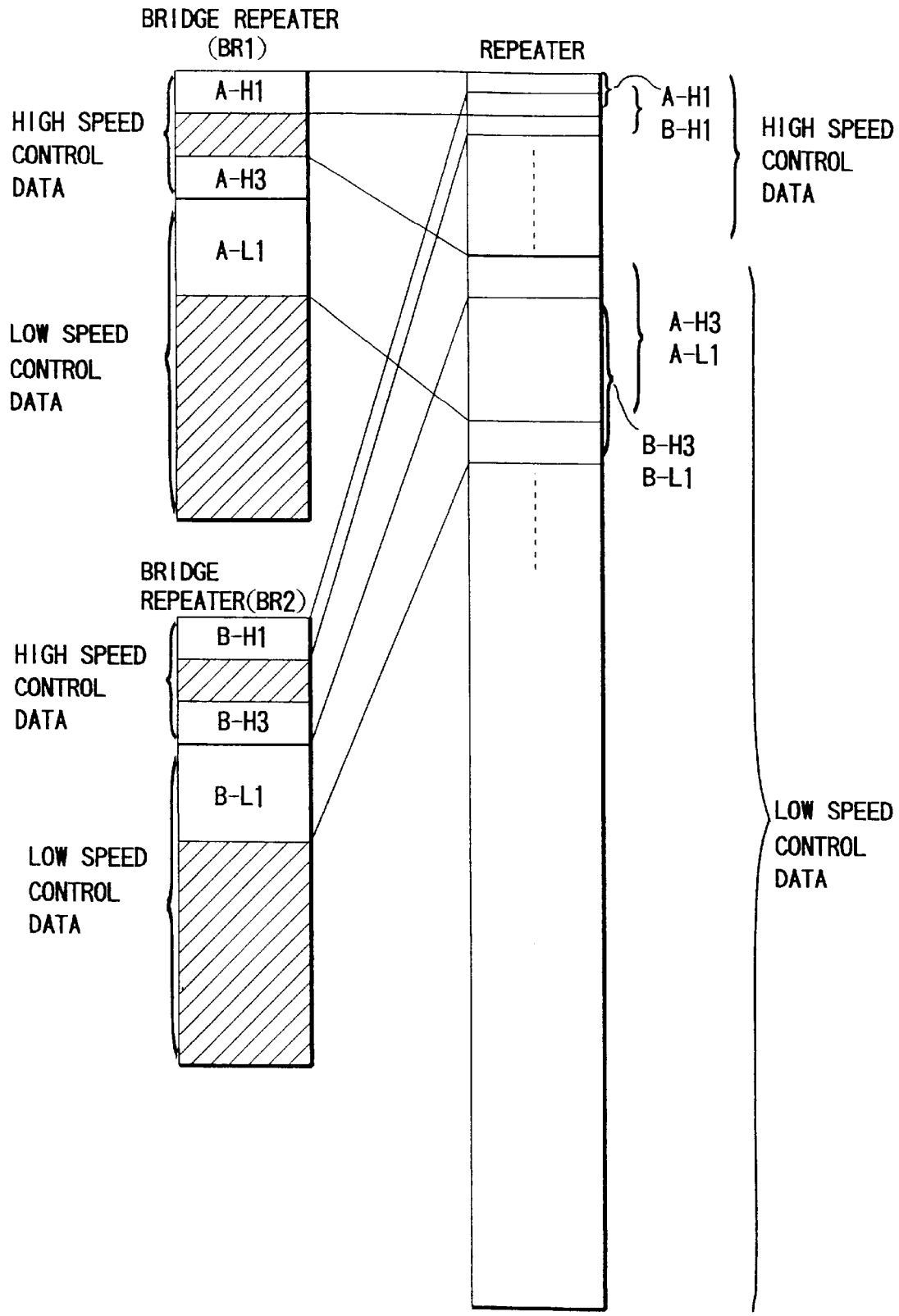
F I G. 17

DATA TRANSMISSION SYSTEM USED FOR PLANT CONTROL AND BASED ON LOCAL AREA NETWORK

BACKGROUND OF THE INVENTION

1. Field of the Invention

The present invention relates to a data transmission system in which a plurality of control terminals (nodes) used in plant control are connected to each other through a known LAN (Local Area Network) such as an ETHERNET (used herein to designate a LAN according to the IEEE 802 standard, e.g., IEEE 802.12 or 802.3 u), data exchange between the control nodes by using repeaters and management software arranged on the LAN.

2. Description of the Related Art

In recent years, in the field of plant control, control components such as personal computers and work stations which are not manufactured for industrial control have been used. When a plant control system is constructed by incorporating general personal computers and the like, an ETHERNET which is one of market standards which are frequently used as LANs in the field of OA (Office Automation), known application software for personal computers, TCP/IP (Transmission Control Protocol/Internet Protocol), and the like are desirably used.

In this case, since the ETHERNET employs a CSMA/CD (Carrier Sense Multiple Access/Collision Detection) scheme, a transmission apparatus is simplified, and transmission can be efficiently performed when traffic is small. However, when data collision occurs in the CSMA/CD scheme, a jam signal is sent to interrupt transmission. After waiting for a predetermined period of time defined by a random number, data is transmitted again. Even in this case, data collision occurs, so-called backoff algorithm control which performs waiting for a period of time defined by making the range of the random number twice is performed. For this reason, collision frequently occurs, long transmission time is required. As a result, even if the signal is sent again, transmission cannot be performed because of collision. In this manner, in the CSMA/CD scheme, collision occurs, after a waiting time defined by a stochastic method has elapsed, transmission is performed again. For this reason, when traffic increases, a waiting time required for re-transmission becomes long, and it becomes impossible to periodically transmit/receive data.

However, when data transmission is not reliably performed in plant control, a serious state such as plant stoppage may occur. For this reason, the plant control requires high reliability. Therefore, the ETHERNET cannot be easily used for data transmission in plant control. In fact, a scheme such as an MAP (Manufacturing Automation Protocol) which is a token bus scheme and can reliably periodically transmit/receive data has been often used.

In order to overcome the problem of the conventional ETHERNET to make it possible to use the ETHERNET, TCP/IP, and the like for data communication in a plant control system, the following means may be used. In the plant control system, PLCs (Programmable Logic Controllers) connected to nodes or various MMI (Man-Machine Interface) apparatuses, the same data is used in different control operations, different displays, different setting calculations, or the like. Therefore, when the ETHERNET is used as a data communication means in the plant control system, one-to-one communication is used to reliably transmit communication data, data request is performed at a time when the control data is required, and the control data must be respectively transmitted from nodes having the control data. In this case, when transmission is sequentially performed the number of destination nodes times with respect to one control data, the efficiency of use of communication resources is degraded.

There is provided an ETHERNET using a demand priority scheme in which no collision occurs with the data frame (data format) of the ETHERNET held. This ETHERNET using the demand priority scheme has a data transmission rate is increased to 100 Mbit/second (conventional ETHERNET: 10 Mbit/second). The Ethernet is being examined in IEEE to be used as a standard (IEEE 802.12: draft stage). The ETHERNET using the priority scheme is called a 100VG ANY LAN because the ETHERNET can cope with not only ETHERNET but also token ring. The ETHERNET is to be called as a demand priority scheme hereinafter.

In the demand priority scheme, a repeater connected to a plurality of nodes can process data having two types of priorities. When transmission requests having the same priority are received from the nodes, transmission rights is fairly given to the nodes in a round robin scheme. In this manner, control of the transmission requests is performed by the repeaters. A LAN in the demand priority scheme is basically constituted by repeaters and nodes, and the repeaters can have a plurality of hierarchies. The topology of the demand priority scheme is of a common bus type, and only one node has a transmission right at once as in the ETHERNET. The repeaters monitor transmission requests from the nodes and determines the next nodes when use of the transmission path is completed to permit transmission. The repeaters preferentially process a request having a high priority, and process a request a low priority later. A transmission right is given in the round robin scheme such that requests having the same priority fairly use the transmission path. The ETHERNET is a LAN of the market standards, and supports the TCP/IP serving as a protocol of the market standards. For this reason, a control LAN which can transmit control data and message data by using the demand priority scheme serving as a high-speed type ETHERNET is advantageously constituted.

However, when the ETHERNET having the demand priority scheme described above is employed as a data communication means for plant control, a problem in which a transmission disable time is extended by a backoff algorithm occurring in collision and which posed when a conventional ETHERNET using the CSMA/CD scheme is used can be avoided. However, the following problems are posed.

(1) Since processes are periodically performed in a programmable logic controller, when transmission requests for control data are sent in accordance with the interrupt cycle, the frequency of transmission requests is excessively high, the number of transmission requests exceeds the limited transmission capacity of the ETHERNET.

(2) When transmission requests for control data are sent when the nodes request control data, the nodes must wait until other transmission performed in generation of transmission requests, the process of the programmable logic controller is delayed by the waiting time.

(3) When the same control data is sent from the same node to a plurality of nodes many times, the ETHERNET cannot be efficiently used.

SUMMARY OF THE INVENTION

The present invention has been made in consideration of the above circumstances, and has as its object to a data transmission system which can efficiently transmit a large amount of data such as control data for plant control at a high speed by using an ETHERNET.

According to the present invention, there is provided a data transmission system in which, on a network constituted by a plurality of nodes and a plurality of repeaters, control data generated by each node is transmitted to another node, wherein an ETHERNET frame is used as a transmission frame, a plurality of blocked control data are stored on the ETHERNET frame, and the control data are periodically transmitted in a multicast manner.

Each node has a control data memory for transmitting/receiving control data.

The transmission frame has a plurality of transmission priorities, each repeater processes a transmission request for control data from the node at a high priority and processes a transmission request for message data from the node at a low priority.

Data transmission is performed by a CSMA/CD scheme on the network, a token is circulated among the nodes to give a transmission right to each node, and a permissible time in which the transmission right can be held at this time is calculated on the basis of a time at which the node previously obtains the transmission right.

Transmission is performed by the CSMA/CD scheme on the network in which the plurality of repeaters are hierarchically arranged, and a transmission inhibit signal is given from an upper repeater to a lower repeater to control a transmission right between the repeaters. A transmission inhibit signal is given from a lower repeater to the nodes to control the transmission right between the nodes.

The lower repeater measures a transmission right use time of the node. If the transmission right use time exceeds a predetermined maximum transmission right use time, transmission of the next frame is forcibly stopped by a transmission inhibit signal, and the transmission right is transferred to the next node.

The overall network is divided in units of networks constituted by a plurality of nodes and one repeater or a plurality of repeaters, and a bridge repeater having a repeater function, a node function, and a bridge function is arranged as a most significant repeater in each network. One repeater or a plurality of repeaters are arranged upstream of the bridge repeater to hierarchically arrange the repeaters, and a control data memory for transmitting/receiving control data to the bridge repeater is arranged.

The destination indicated by the frame header message data received from the upper or lower repeater is determined, only corresponding message data are transmitted to the upper or lower repeater, and only corresponding control data are transmitted from the control data memory to the upper or lower repeater.

A block type representing the total block number of control data to be transmitted and the size of one block is stored in a register, and a block start address is stored in a counter. Thereafter, a read address of the control data memory is designated by the counter, and the counter value and the block type are compared with each other by a comparator to switch the read block. The block number read from the control data memory and the total block number are compared with each other by another comparator to detect that all the blocks are transmitted.

Data transmitted from nodes are read from the control data memory through a hardware circuit having a register, counter, and comparators.

The block type representing the total block number of the control data and the size of one block is extracted from the ETHERNET frame which performs reception through a node, and is stored in the register. A block start address is extracted from the ETHERNET frame, and is stored in the counter. Thereafter, the write address of the control data memory of the node is designated by the counter, and the counter value and the block type are compared with each other by the comparator to switch the write block. The block number written in the control data memory and the total block number are compared with each other by another comparator to detect that all the blocks are written.

Data received by the nodes are stored in the control data memory through a hardware circuit having a register, a counter, and comparators.

The control data to be transmitted from the nodes are classified into high speed control data and low speed control data which have different transmission cycles, the blocks of the blocked control data of the high speed control data are stored in the ETHERNET frame and transmitted within a first transmission cycle. The blocks of the blocked control data of the low speed control data are stored in the ETHERNET frame and transmitted within a second transmission cycle which is integer times longer than the first transmission cycle.

The present invention has the following function by the following means.

Since each node transmits control data in a multicast manner through an ETHERNET frame, the same data need not be repeatedly transmitted to a plurality of nodes, the control data can be transmitted at a high speed on the ETHERNET.

Since each node transmits/receives an ETHERNET frame through a control data memory, when a host or the like connected to the node accesses the control data memory, the latest control data can be accessed without any lag.

The control data is transmitted by using the ETHERNET frame on an ETHERNET which employs the demand priority scheme, and the control data are transmitted/received through the control data memory in each node. Control data has a high priority, and message data has a low priority. For this reason, the control data can be reliably transmitted in a predetermined cycle, and the message data can be intermittently transmitted by using a space.

On a network which transmission is performed by the CSMA/CD scheme, control data, message data, and token are transmitted by using the ETHERNET frame, the frame of at least control data is transmitted in a multicast manner. Since a node acquires and transfers a transmission right by the token, each node measures a time required for circulating the token to calculate a time in which the transmission right can be held. Since the message data can be transmitted at once within the permissible time, data to be transmitted to the nodes are largely different from each other, transmission can be rapidly transmitted without being forced to fairly have a transmission right unlike a case wherein the demand priority scheme is used. In addition, when the token is lost for a certain reason, since transmission can be performed by the SCMA/CD scheme, the token can be rapidly recovered.

On the network in which transmission is performed by the SCMA/CD scheme, one repeater or a plurality of (hierarchical) repeaters performs control such that the transmission right is given by using a transmission inhibit signal. For this reason, collision does not continuously occur, and high-speed and efficient transmission can be performed.

When the repeater measures a transmission right use time, and the transmission right exceeds the maximum transmission right use time, transmission of the next frame is forcibly stopped to transfer the transmission right. For this reason, the following drawbacks can be prevented. That is, only one node occupies a transmission path to delay transmission of another node, and the entire transmission cycle is extended.

The overall network is divided into a plurality of parts, data can be transmitted/received in respective networks, only required data can be selectively transmitted and received between the networks.

A hardware circuit constituted by a register, a counter, and a comparator which are arranged in a node reads data of the control data memory of the corresponding node. Therefore, a large amount of control data is efficiently processed in the node.

The hardware circuit constituted by the register, counter, comparator which are arranged in the node extracts data in units of blocks from an ETHERNET frame received by the node to transfer the data to the control data memory, the control data is efficiently processed in the node.

A different transmission delay time is required by the control data depending on the type of the control data. Since a transmission cycle can be selected in accordance with the type of the control data, the number of times of transmission of the control data which can require a long transmission delay time can be reduced, and the transmission path can be effectively used.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 2A and 2B show a transfer format of control data and message data in the first embodiment;

FIG. 3 is a view showing the arrangement of a node arranged in the first embodiment;

FIG. 7 is a timing chart of a second embodiment in which an ETHERNET using a CSMA/CD scheme is employed;

FIG. 9 is a view showing the arrangement of a repeater arranged in the second embodiment;

FIG. 12 is a flow chart for explaining an entire operation in the third embodiment;

FIG. 13 is a flow chart for explaining a part of a transmission operation in the third embodiment;

FIG. 14 is a part of a flow chart for explaining an operation of a modification of the third embodiment;

FIG. 15 is a view showing the entire arrangement of a fourth embodiment;

FIG. 16 is a view showing the arrangement of a bridge repeater arranged in the fourth embodiment; and FIG. 17 is a view showing a control data map in the fourth embodiment.

DETAILED DESCRIPTION OF THE PREFERRED EMBODIMENTS

A preferred embodiment of a data transmission system according to the present invention will now be described with reference to the accompanying drawings. The present invention will be described by using a system for transmitting control data of a plant control system as an example.

(First Embodiment)

Figure 1:
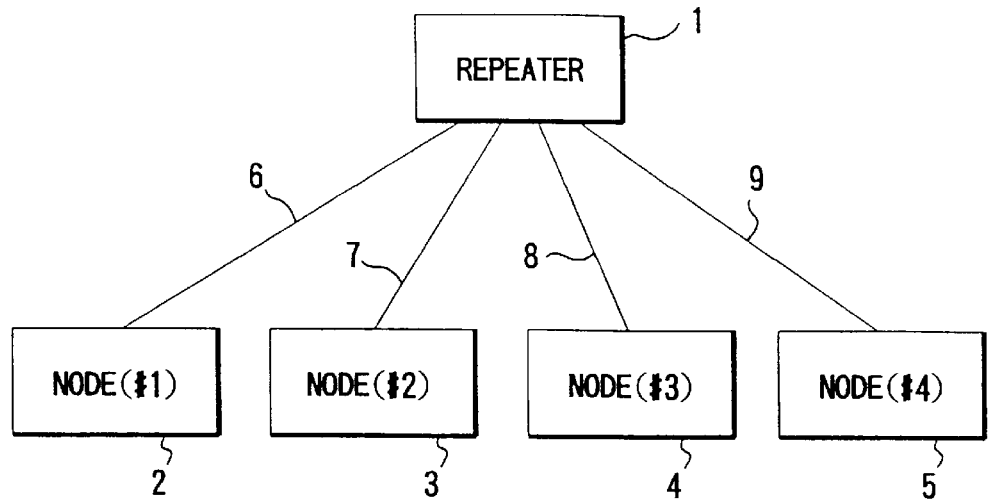
FIG. 1 shows an ETHERNET using demand priority scheme on which a first embodiment of the present invention is based.

This embodiment exemplifies a data transmission system using an ETHERNET employing a demand priority scheme. FIG. 1 shows an ETHERNET using a demand priority scheme. A plurality of nodes 2 to 5 serving as control terminals are connected to a repeater 1 through transmission paths 6 to 9 in the form of a star coupler. The repeater 1 and the nodes 2 to 5 are topologically connected to each other by a bus, and only one node can perform transmission at once. A node serving as a transmitter periodically multicasts control data to all the nodes, and each node holds the control data in a corresponding one of control data memory in accordance with a predetermined map, and a host such as a programmable logic controller connected to the nodes can access the control data memories.

In this case, the control data is data used for controlling an actual machine, and the transmission delay of the control data is not permitted. Since the control data is periodically transmitted every predetermined period of time, and is sequentially updated, an error is allowed to be included in one data transmission operation. In plant control, there is message data other than the control data. The message data is data for man-machine interface, small transmission delay is permissible. However, unlike the control data, the message data is transmitted only once, an error is not allowed to occur in the transmission of the message data.

A defacto standard of a communication protocol in a LAN is TCP/IP. In this embodiment, in order to make it possible to perform transmission following the TCP/IP, a transmission frame related to message data is structured on the basis of a transmission format ruled in the TCP. Since there is no defacto standard related to control data, a transmission frame is structured by an arbitrary transmission format on a UDP (User Datagram Protocol) of the TCP/IP. For this reason, a large number software resources of the TCP/IP can be used. A large number of resources such as FTP, TELNET, and NFS can be used.

FIG. 2A shows a transmission format of control data, and FIG. 2B shows a transmission format of message data. The frame of the control data, as shown in FIG. 2A, is constituted by an ETHERNET header, an IP header, a UDP header, UDP data, and an FCS (Frame Check Sequence). The ETHER- NET header designates a destination MAC (Medial Access Control) address, a transmitter MAC address, and a communication protocol (in this case, designates that the communication protocol is the IP). In the present invention, a multicast address is designated. Since the IP header processes IP (Internet Protocol), a destination, a transmitter, a fragment, the length of data, check sum, and an UDP serving as an upper protocol are designated by an IP address. In this case, when an upper protocol portion is set in the TCP, the TELNET or the like using the TCP can be used. The UDP header designates a data length, check sum, and a port number to be used. As the port number, a predetermined port number is determined by the upper protocol. That is, the upper protocol can be designated by the port number. In control data, a new port number which is not used is determined to be used. As described above, transmission of the control data is performed in accordance with the UDP in the TCP/IP.

As the UDP data, actual information is stored. As data, continuous data of a 64-word unit is used. Therefore, in order to transmit one block, a total of 66 words constituted by two words of a block start address and 64 words of the block data are transmitted as a unit. A block type representing a data amount per block and the number of blocks transmitted by one frame are written at the start of the UDP data. As the UDP data, both high speed and low speed control data are present in one frame. In a block type, a 64-word unit is used as a default, and the block type can be generalized such that another block unit (e.g., a 32-word unit or a 16-word unit) can be selected depending on the application of a system. CRC (Cyclic Redundancy Check) is performed as FCS for error check at the end of the frame. The CRC is automatically formed by the MAC in transmission.

In the control data, although a block data portion changes as the contents of the frame, the headers, the total block number, and the like do not change. The start portion of the frame is formed in advance (to be referred to as a frame header), and the first portion can be efficiently transmitted in such a manner that the actual contents of the control data which can be changed, i.e., the combination of block data.

The frame of the message data, as shown in FIG. 2B, is a known TCP transmission format. The detail of the TCP transmission format is described in the RFC (Request For Comments) specification or the like. In the control data in FIG. 2A, UDP data changes into TCP data, and the TCP header whose contents are different from the UPD header is used in place of the UPD header, thereby structuring message data.

The nodes 2 to 5 shown in FIG. 1 have the same arrangement. The arrangement of the node 2 is shown in FIG. 1 as an example. A signal from a transmission path 6 or a signal to the transmission path 6 is interfaced by a transceiver (TR) 11, and connected to a media access controller (MAC) 12 through a signal path 20 as a data signal or a control signal to be transmitted/received. The media access controller 12 is an LSI circuit for controlling a media access controller layer. The media access controller 12 mutually converts serial data of the signal path 20 into parallel data, and checks the ETHERNET header. If the frame is a self-designated frame, the data is stored in a buffer memory (BF) 13 as reception data. CRC check serving as FCS is always performed to the reception data, and it is checked whether the FCS obtained by check coincides with FCS formed by a transmission node at the end of the received frame.

In transmission, the media access controller 12 converts a transmission frame into serial signals within a time permitted in accordance with a signal from the transceiver 11. CRC formed on the basis of transmission serial signals is added to the end of the frame. The transmission frame except for the FCS is stored in the buffer memory 13 in advance. In this manner, the media access controller 12 has a function of transmitting a transmission/reception frame. In some media access controller 12, the buffer memory 13 may be replaced with another memory.

In the node 2, a control data memory (MD) 16 for storing control data and a memory (M) 17 for message data, various processes, and a program of a microcomputer are arranged. The memory 17 can be constituted by a RAM or a PROM and RAM. In this embodiment, the memory 17 is constituted by a PROM and a RAM. The node 2 is connected to a host system (not shown) such as a programmable logic controller through an interface (IF) 23.

When the host system transmits control data, the data is written from the host system at a corresponding address of the control data memory 16 through the interface 23. Since the node 2 periodically transmits the data of the control data memory 16, the latest control data is transmitted. Since control data from another node is periodically received by the node and written in the control data memory 16, the host system can always access the latest data through the interface 23. More specifically, the host system can access the latest data as if the control data generated by a distant node exists in the control data memory of the self node.

A CPU 14 performs a transfer process of data between the buffer memory 13 and the control data, formation of a frame, management of a transmission cycle, and the like. Required time information is input from a timer (TIM) 21 to the CPU 14. The control circuit (CONT) 15 performs a transmission procedure of the control data . The control circuit 15 is not required when a transmission amount is small. Reference numerals 18, 19, 20, 22, and 24 denote signal lines for connecting blocks to each other.

A transmission operation in the entire embodiment arranged described above will be described below in detail.

In the plant control system, since the control data is often used in a plurality of nodes, a node which performs transmission periodically multicasts the control data to all the nodes. Multicasting is performed because multicasting is more efficient than a case wherein one-to-one transmission of the same data between the plurality of nodes is performed. Periodical aims at the following. When transmission is repeated in a cycle equal to or smaller than an update cycle of data which is required by a host system such as a programmable logic controller connected to nodes, the programmable logic controller can obtain data without waiting.

Figure 4:
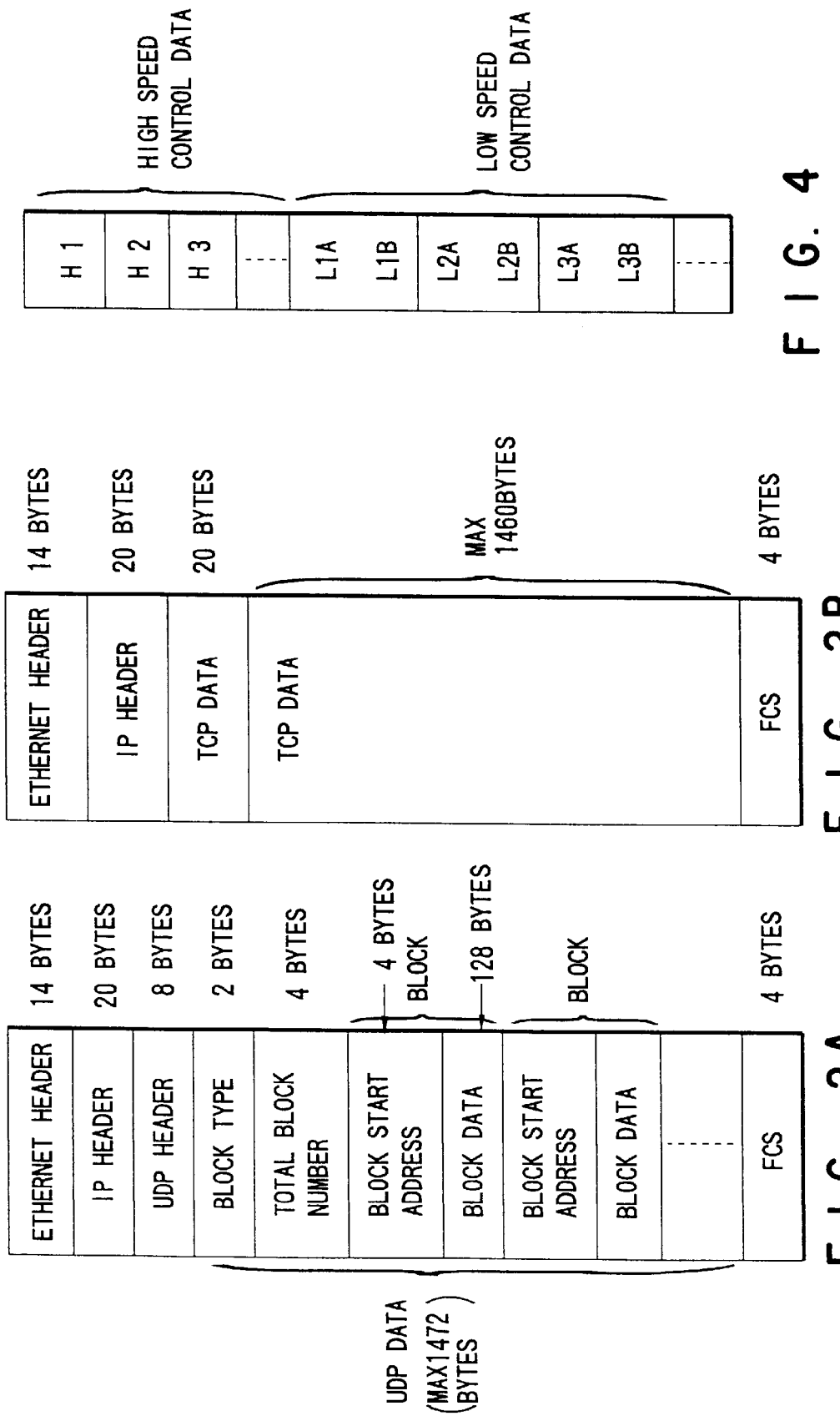
FIG. 4 is a view showing the memory map of a control data memory.

The control data received by each node is stored in the control data memory 16 of the node in accordance with a map shown in FIG. 4. As described above, as control data, high speed control data and low speed control data are present. As shown in FIG. 4, the high speed control data is stored in the front half portion of a small address in a memory space, and the low speed control data is stored in the rear half portion of a large address. Reference symbols H1 and H2 denote blocks of data to be transmitted by the first node 2 and the second node 3. The blocks H1 and H2 are stored in units of 64-word blocks described above. Reference symbols L1A, L1B, and L2A, and L2B denote low speed control data, in which each number denotes a node number to be transmitted, and A and B denote the types of frames to be transmitted.

Figure 5:
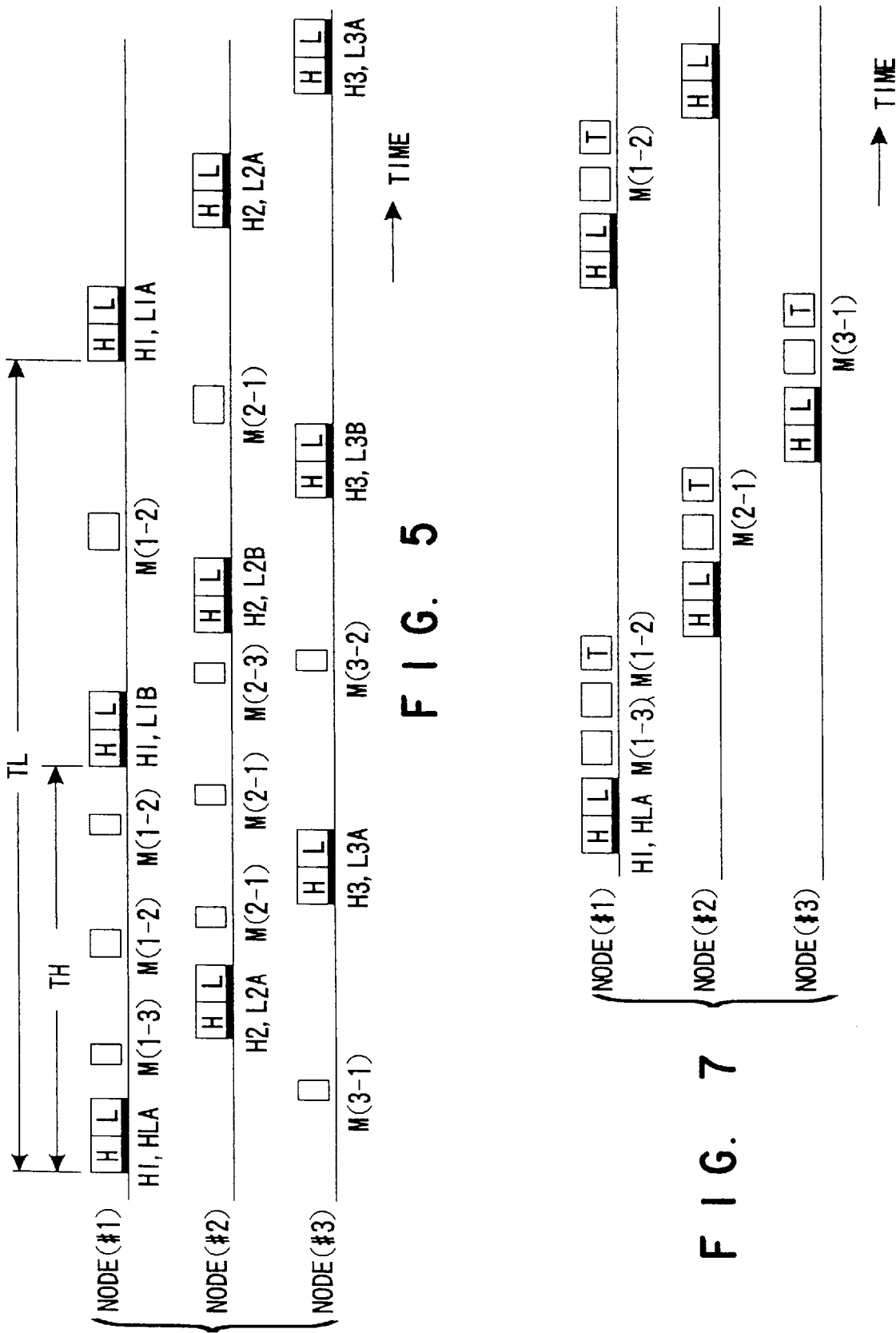
FIG. 5 is a timing chart of the first embodiment.

For descriptive convenience, FIG. 5 shows a flow chart of data transmission of three nodes (in this case, the first (#1)

node 2 to the third (#3) node 4. Each square indicates a transmission frame. The frames each having a bold solid line drawn at the lower portion are frames which perform multicasting, and the other frames are frames which do not perform multicasting (i.e., performs unicasting). Each node manages a transmission cycle by using the timer 21.

The transmission cycle of the high speed control data is represented by TH, and the transmission cycle of the low speed control data is represented by TL which is an integer times larger than TH. The CPU 14 transmits the data block of the high speed control data and a part of the data block of the low speed control data as one block of one frame in the transmission cycle TH on the basis of the time information from the timer 21. All the high speed control data are transmitted in the transmission cycle TH. The low speed control data is partially divided, and the divided data are sequentially transmitted in the transmission cycle TH together with the high speed control data. As a whole, all the data are transmitted in the transmission cycle TL.

In the timing chart shown in FIG. 5, with attention to the first node #1, the high speed control data transmits the data Hl in the cycle TH. The low speed control data is divided into data L1A and data L1B in the first cycle, and all the low speed control data are transmitted in a cycle which is twice larger than that of the high speed control data. The other nodes #2 and #3 periodically transmit the high speed data and the low speed data.

In the example shown in FIG. 5, the high speed control data are stored in one frame to be transmitted. However, when all the high speed control data can be transmitted within the cycle TH, the high speed control data are transmitted by a plurality of frames. FIG. 5 exemplifies a case wherein a part of the low speed control data is included in the frame in which the high speed control data are stored. The low speed control data may be stored in one frame to be transmitted. In the plant control system, the control data must be transmitted within a predetermined period of time, the priority of the control data is set to be high in the demand priority scheme. The repeater 1 fairly permits transmission requests having the same priority to use transmission paths in a round robin scheme. Therefore, the nodes #1 to #3 periodically transmit the control data. The transmitted control data are multicasted, all the nodes in which the same address is registered as a multicast address are received at once. Since the LAN is not specified for control, personal computers which do not use control data can be connected to the LAN. In this case, when no multicast addresses are registered in the personal computers, control data is not received by the personal computers. The control data received by the nodes are stored in the control data memories 16 of the nodes, respectively.

The transmission request of message data is sent when the message data is required. For this reason, in a period in which no control data is received, the repeater 1 receives a transmission request at a low priority to permit transmission in the round robin scheme. In the example shown in FIG. 5, message data M(3-1) is transmitted from the node #3 to the node #1. M indicates that the data is message data, and (3-1) indicates that the data is transmitted from the node #3 to the node #1. The node #1 transmits the data M(1-3) to the node #3 as a response to the message. These operations are performed in an idle time in which control data is not transmitted.

As described above, the nodes #1 to #4 transmit control data in a required cycle, and all the nodes which require the control data receive the control data to store the control data in the respective control data memories 16. When the host system accesses the control data memory 16, the host system such as a programmable logic controller can receive and transmit the control data without wasting transmission time.

In this case, the operations of the nodes #1 to #4 will be described below. In this case, since the nodes #1 to #4 have the same arrangement and the same operation, one node #1 will be exemplified.

Transmission of message data by TCP/IP will be described below.

A host system gives control data such as an MAC address, an IP address, a port number, and a data length which serve as sources for forming a TCP data portion, a TCP header, and an IP header to the memory 17. When the CPU 14 knows that data are completed by interruption or the like, the CPU 14 starts formation of an Ethernet frame.

Since the ETHERNET can transmit data of 1,500 bytes at once, IP fragment is performed as needed to divide the data into a plurality of frames. An ETHERNET frame or a plurality of ETHERNET frames are formed in the memory 17 on the basis of the control data to perform preparation for transmission in accordance with the TCP/IP.

When the CPU 14 writes a frame to be transmitted in the media access controller 12, the data frame is stored in the buffer memory 13. When the CPU 14 gives a transmission command to the media access controller 12, and the repeater 1 permits the corresponding node to transmit the data, the transmission frame stored in the buffer memory 13 is transmitted. Upon completion of transmission, or upon completion of an error, interruption occurs. For this reason, a necessary process is performed by the interruption.

The received message data of a frame type is written in the buffer memory 13. When the message data is stored in the buffer memory 13, the status of the received frame is checked. If the reception is free from an error, the frame is transferred from the buffer memory 13 to the memory 17. If the data is subjected to fragmentation, a process such as a synthesizing process is performed, and an error check such as a check sum in the header is performed. When the data is received, the CPU 14 sends interrupt to the host system, and the CPU 14 notifies the host system of reception. When an error occurs, a process such as re-transmission is performed.

A transmission operation of control data using UDP will be described below.

As shown in FIG. 2A, UDP data has a simple arrangement, but the UDP data cannot be sequentially stored by a DMA controller. This is because block start addresses are not sequentially arranged. For this reason, an address must be changed every predetermined words (e.g., 64 words). When the DMA controller has transfer performance of a 32-bit unit, transfer must be performed 32 times to transfer all data corresponding to 64 words. If a time required to perform one transferring operation is 0.1 $\mu$s, calculation and change of an address must be performed every 3.2 $\mu$s. As a result, the CPU always receives DMA interruption. This is inefficient. When the CPU performs the process, a load on the CPU increases.

In this embodiment, the control circuit 15 operates as a simple DMA controller with respect to control data whose transmission amount is large. The control circuit 15 loads the block type of the UDP data, and then loads a total block number, and holds the block type and the total block number in an internal counter. In addition, a block start address is read to be set in a block address counter. The block start address is extracted as in the DMA controller, reception data is read from the media access controller 12 to be written in the control data memory 16. When data of 64 words is written, a total block number counter is incremented. If the counter number does not coincide with the loaded total block number, the next block number is read and processed in the same manner as described above. In the control data, since the number of frames to be received is absolutely large, a high-speed operation can be effectively performed. As a matter of course, a transmission function can also be arranged.

Figure 6:
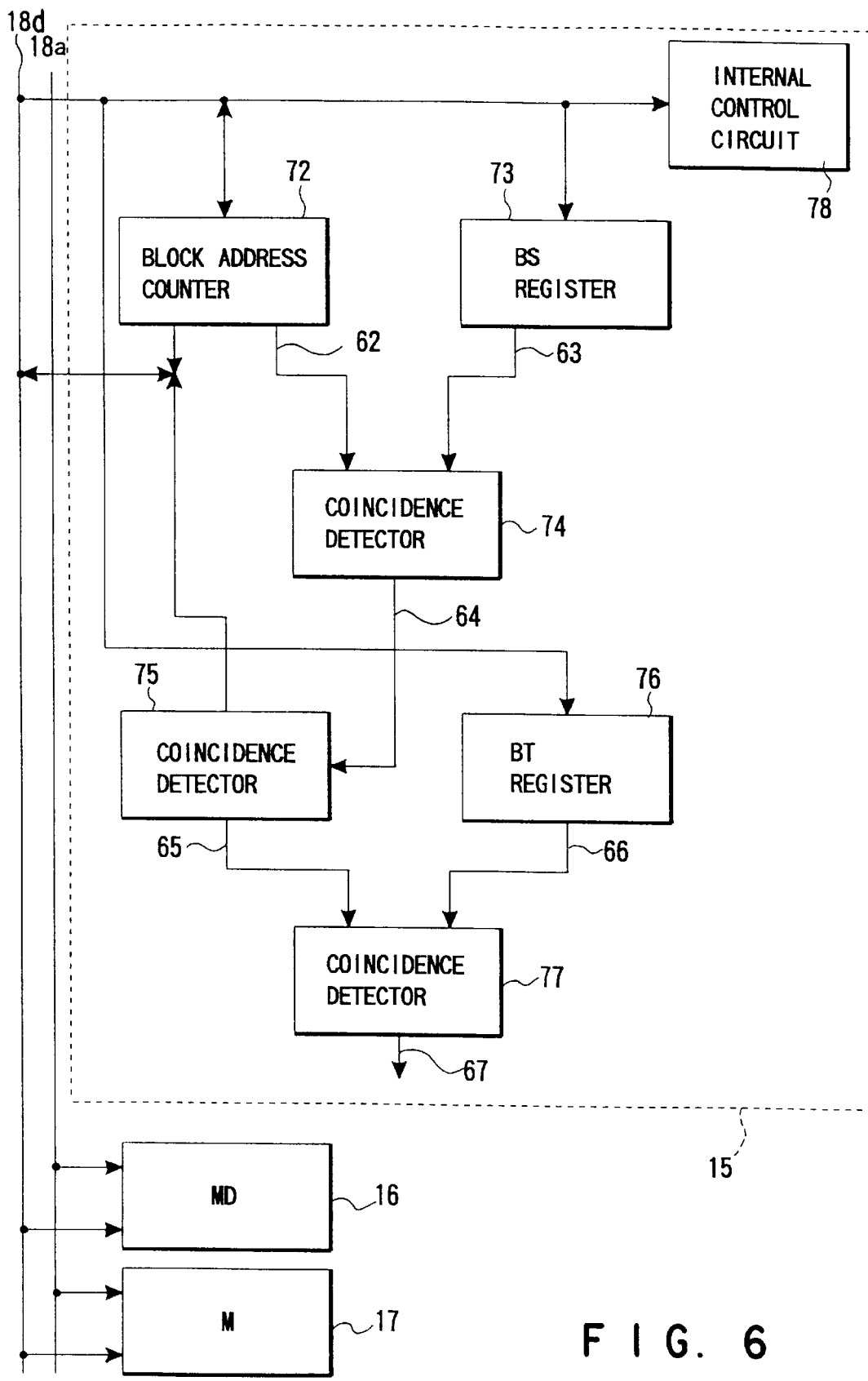
FIG. 6 is a view showing the arrangement of a control circuit arranged in the node and peripheral arrangement components.

FIG. 6 shows the detailed arrangement of the control circuit 15.

The three blocks, i.e., the control circuit 15, the control data memory 16, and the memory 17 in the node are connected to an address signal line 18a, a data signal line 18d representing the contents of data, and a control signal line (not shown) which is a signal for performing control.

Processing steps for writing received control data in the control data memory 16 through the control circuit 15 are as follows.

Assume that the CPU 14 loads the frame header of the received frame, and that it is known that transmission of control data is performed. The block type which is the first data is read by the CPU 14 from the buffer memory 13, and is written in a BS register 73 in the control circuit 15. The block type indicates the size of one block. In the default, the size is 64 words (step S1).

The CPU 14 reads the total block number from the buffer memory 13, and writes the total block number in a BT register 76 in the control circuit 15 (step S2).

The CPU 14 commands the control circuit 15 to load reception data. The load command from the CPU 14 is given to an internal control circuit 78 (step S3).

The internal control circuit 78 loads a block start address from the buffer memory 13, and writes the block start address in a block address counter 72 (step S4).

Subsequently, the internal control circuit 78 performs control to read the control data from the buffer memory 13 and write the control data in the control data memory 16.

The contents of the block address counter 72 are given to the address signal line 18a, and the data is read from the buffer memory 13 to be given to the data signal line 18d. The data are written in the control data memory 16 by using the address and data lines 18a and 18b. At the same time, the block address counter 72 is incremented by a number corresponding to the word length of the data to be written. In this example, since the word length corresponds to 32 bits, i.e., 2 words, the block address counter 72 is incremented by 2 words.

Whether data having a size corresponding to the size of the block is written is determined by causing a coincidence detector 74 to compare the lower bit of the register 73 with the lower bit of the block address counter 72. In this example, since 64 words correspond to one block, it is determined whether transfer is performed 32=64/2 times. This determination is performed by comparing the lower 5 bits of the block address counter 72 with each other (step S5).

The above process is repeated until transfer of one block is completed. Upon completion of transfer of one block, a block number counter 75 is incremented, and a coincidence detector 77 compares the number of the block number counter 75 with the number of the total block number register 76. If the number of the block number counter 75 coincides with the number of the register 76, i.e., if transfer of all the data is completed, a signal 67 is given to the internal control circuit 78 to end the operation of the control circuit 15. If the number of the block number counter 75 does not coincide with the number of the register 76, the flow jumps to the process in step S4 (step S6).

As described above, the reception data is written in the control data memory 16.

A case wherein transmission data is read from the control data memory 16 and written in the buffer memory 13 will be described below. Assume that data to be transmitted is written in the control data memory 16, and that a predetermined number of block start addresses are written at a fixed address of the memory 17.

First, the CPU 14 writes headers, block types, and a total block number in the buffer memory 13. At the same time, the block types and total block number are written in the register 73 and the register 76 in the control circuit 15. The CPU 14 commands the internal control circuit 78 to read transmission data. By this portion, the block number counter 75 is initialized (step T1).

In response to the command of the internal control circuit 78, the block start address stored at the fixed address of the memory 17 is read and written in the block address counter 72. An address for reading the memory 17 is formed by combining the block number counter 75 and an address indicating the start of the fixed address. More specifically, the block number counter 75 designates an offset from the fixed address. Therefore, in access to the first memory 17, the first block start address is read (step T2).

The loaded block start address is written in the buffer memory 13 from the block address counter 72 through the media access controller 12 (step T3).

The control data to be written is read from the control data memory 16 by address designation of the block address counter 72, and the control data is written in the buffer memory 13 through the media access controller 12. The moment the data is written, the block address counter 72 is incremented. In this example, since the data corresponds to 32 bits, i.e., 2 words, the block address counter 72 is incremented by 2 words. Whether data having the size of a block is written is determined by causing the coincidence detector 74 to compare the lower bit of the register 73 with the lower bit of the block address counter 72. In this example, since 64 words correspond to one block, it is determined whether transfer is performed 32=64/2 times. This determination is performed by comparing the lower 5 bits of the block address counter 72 with each other (step T4).

When transfer corresponding to one block is not completed, the above process is repeated. when the transfer is completed, the block number counter 75 is incremented, and the coincidence detector 77 compares the number of the block number counter 75 with the number of the total block number register 76. If the number of the block number counter 75 coincides with the number of the register 76, i.e., if transfer of all the data is completed, the signal 67 is given to the internal control circuit 78 to end the operation of the control circuit 15. If the number of the block number counter 75 does not coincide with the number of the register 76, the flow jumps to the process in step T2.

The function of the control circuit 15 described above is obtained by combining a counter or a register and a logic circuit. For this reason, the control circuit 15 can be easily constituted by a FPGA (Field Programmable Gate Array) or a GA (Gate Array) which is provided at low cost.

As described above, according to this embodiment, the following effects can be obtained.

(1) Each node comprises the control data memory 16, and each node multicasts control data to all the nodes to share the control data. For this reason, the same data need not be sequentially transmitted to the plurality of nodes, respectively, transmission resources can be effectively used, and a time required for transmission can be shortened.

(2) Similarly, each node comprises a control data memory, and sequentially updates multicasted control data. For this reason, a programmable logic controller or the like serving as a host system directly connected to the node can access the latest control data without lag. Therefore, distant data can be processed like directly connected data.

(3) Since each node repeatedly multicasts control data, if a signal erroneously operates by external noise to prevent transmission from being normally performed, re-transmission is automatically performed.

(4) Transmission delay time required by control data is changed depending on the control data. In this embodiment, optimum control data transmission cycles are set for high speed control data and low speed control data, respectively. In this manner, transmission paths can be effectively used without worthlessly transmitting data whose transmission delay time may be large many times.

(5) In this embodiment, the demand priority scheme is employed, the priority of control data is set to be high, and the priority of message data is set to be low. In this manner, the control data can be reliably transmitted in a predetermined cycle. On the other hand, since the message data can be transmitted by effectively using an idle transmission path, the message data can be rapidly transmitted.

(6) With respect to data having the same priority, the repeater transmission right to each node in the round robin scheme. For this reason, the nodes fairly have transmission right.

(7) A frame of the ETHERNET serving as a defacto standard is directly used, and all transmission operations are performed on the TCP/IP serving as a defacto standard. For this reason, known enormous software can be used, and development costs can be decreased. High opening properties can be obtained. In this case, the ETHERNET frame is not limited to an original ETHERNET frame formation. For example, the ETHERNET frame includes a frame obtained such that an ETHERNET frame is set on a frame of a formation following the OSI of ISO.

(8) Since control data is transmitted on the UDP, the control data can be easily constituted on the known TCP/IP. When the transmission amount of the control data is small, special hardware is not necessary.

(9) Since the control circuit 15 constituted by simple hardware is arranged and used as a simple DMA controller, when the number of control data is large, processing can be performed at high efficiency.

(10) Since the ETHERNET has a function improved to 100 Mbit/seconds, many manufacturers provide LSIs, repeaters, and nodes. For this reason, the entire system can be manufactured at low cost.

This embodiment can also be modified as follows. In the above description, although an ETHERNET frame is used, the ETHERNET frame can be set on a frame of an IEEE 802.3 formation in an SNMP (Simple Network Management Protocol). This is standardized by RFC1042. More specifically, an ETHERNET frame can be set in a frame of the formation following the OSI of ISO. In some apparatus such as a known work station, a TCP/IP protocol can be processed in ether of the original ETHERNET formation or the IEEE 802.3 formation. Therefore, the ETHERNET frame can include both the formations.

A repeater having a switching function has been used. Although the switch is not effective in a multicasting operation, the switch is effective in a unicasting operation. In this case, the repeater having a switching function can be used.

Other embodiments of the present invention will be described below. The same reference numerals as in the first embodiment denote the same parts in the other embodiment, and a description thereof will be omitted.

(Second Embodiment)

The first embodiment describes an example wherein control is performed in the demand priority scheme to prevent collision from occurring. The second embodiment in which the CSMA/CD scheme is applied to the ETHERNET whose speed is increased to 100 Mbits/second will be described below. The basic arrangement of this embodiment is the same as that of the first embodiment. Although not shown, a media access controller 12 and a transceiver 11 in a node do not use a demand priority scheme but the CSMA/CD scheme.

As the ETHERNET of 100 Mbits/second, a scheme (present draft stage) in which a CSMA/CD scheme of 10 Mbits/second at a present level is employed, and standardization is performed as IEEE 802.3u is available. As this scheme, the following schemes of two types are known. That is, the scheme of one type is a scheme in which control is performed in a software manner to prevent collision. The scheme of the other type is a scheme in which control is performed to prevent repeaters from colliding with each other. In this embodiment, the former scheme is employed.

In the media access controller, processes which are almost the same as those of the ETHERNET are performed. For this reason, the media access controller can easily correspond to a plurality of schemes, and an LSI which can cope with schemes of two types is developed. Therefore, when the media access controller is used in common, and only a transceiver is caused to cope with a transmission path (only this portion is made replaceable as a daughter board), hardware is commonly used.

FIG. 7 shows a timing chart of this embodiment. Referring to FIG. 7, a token is indicated by T in a frame. Other symbols are the same as those in the first embodiment.

When a node #1 has the transmission right of a transmission path, the node #1 stores a time at which the transmission right is obtained and transmits control data. The node #1 calculates an elapsed time from when the previous transmission right is received, and calculates a time in which the transmission right can be held to assure a predetermined transmission cycle. However, the maximum permissible time is determined in advance to prevent only one node from occupying the transmission path for a long time. In addition, the elapsed time is calculated for the following reason. That is, since data transmission is intermittently performed in message transmission, the message transmission copes with a variation in time required for circulating the token once.

Until the permissible time has elapsed, message data whose transmission preparation is completed at present is transmitted, and a frame for giving a token to a next node #2 is finally transmitted. The same process as described above is performed in the node #2 which acquires the token, and the transmission right is sequentially transferred to a node #3, a node #4, and the node #1.

In the first embodiment using the demand priority scheme, the repeater 1 controls a transmission path.

However, in the second embodiment using the CSMA/CD scheme, the repeater 1 does not perform any control, and has only a function of amplifying a reception signal to transmit the amplified signal.

In this case, the token is constituted by using a UDP. The token is indicated by a port number of the UDP. The token is transmitted from a node which has transmission right at present to a node to which the next transmission right is given. Whether the token is sent to another node is determined by checking whether the node multicasts control data.

Transmission of a token itself can be multicasted. In this case, as UDP data, the token has a next transmission node and a present transmission right node as information. In this manner, a node determines whether the token is designated to the node.

By using a case wherein a token is not multicasted as an example, a transmission operation in this embodiment will be described below.

A node having no transmission right always receives a frame, and performs different processes depending on whether the frame is control data or message data. This operation is the same as that in the demand priority scheme.

When transmission is performed, the same operation as that in the first embodiment until transmission data is stored in a buffer memory 13. However, actual transmission is not started until a token is received to obtain transmission light. Reception of the token is known such that a frame received by a media access controller 12 is determined by a CPU 14. In the demand priority scheme, control data is periodically transmitted, and message data can be freely transmitted for an idle time. However, in this case, the control data and the message data are transmitted at once when the token is received. For this reason, an elapsed time is calculated as described above, and the number of data which can be transmitted when transmission right can be obtained is calculated, thereby determining a frame to be transmitted. More specifically, although the control data is necessarily transmitted, transmission of the message data which is an intermittent request is waited until the next token is received. The CPU 14 causes a timer 21 to perform control for this operation.

A merit of the CSMA/CD scheme is as follows. That is, when a token is lost for some reason, the token can be easily recovered. More specifically, even if collision occurs, since transmission/reception can be arbitrarily performed as an ETHERNET frame, restarting can be easily performed. In a token bus scheme, restarting requires a long period of time because procedures for a special rearrangement must be performed.

As described above, according to the present embodiment, a node obtains transmission by a token or transfers transmission right, and a time in which a self-node has transmission right is controlled by measuring a time required for circulating the token once. For this reason, message data can be transmitted at once within a range which does not exceed a predetermined one-circulation time. More specifically, when data to be transmitted by nodes are largely different from each other, unlike the demand priority scheme, it is not forced that the nodes always have the same transmission right. As a result, the control data can be rapidly transmitted.

Further, when a token is lost for some reason, transmission can be always performed in the CSMA/CD scheme. For this reason, the token can be easily recovered within a short time in comparison with recovering of a token in a token bus scheme.

The above has exemplified an ETHERNET frame as a frame. However, in a formation called SNAP, an ETHERNET frame is set on a frame of IEEE 802.3. This is standardized by RFC1042. In some apparatus such as a known work station, a TCP/IP protocol can be processed in either of an original ETHERNET formation or IEEE 802.3 formation. Therefore, the scheme described in this embodiment can include both the formations as an ETHERNET frame.

(Third Embodiment)

Figure 8:
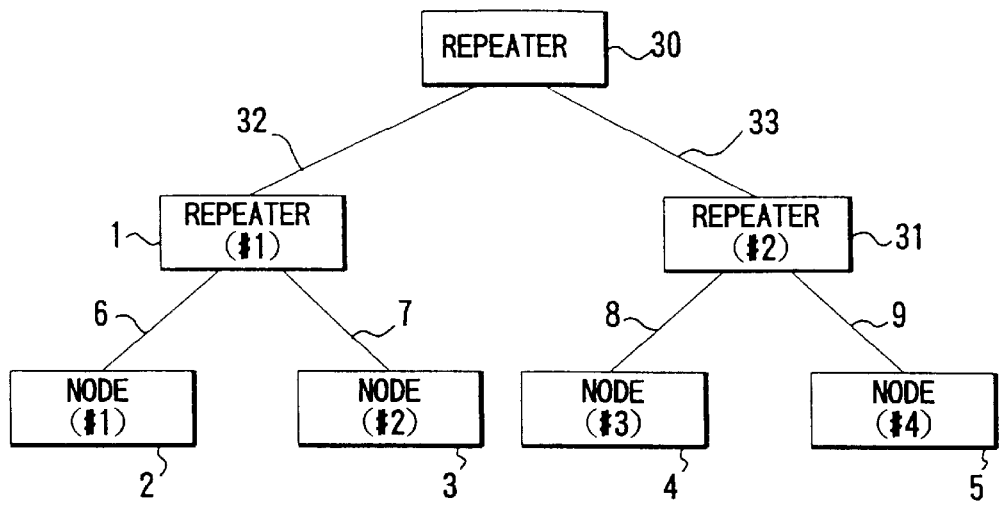
FIG. 8 shows an ETHERNET employing a CSMA/CD scheme on which a third embodiment of the present invention id based.

In this embodiment, as in the second embodiment, a CSMA/CD scheme is employed in an ETHERNET whose speed is increased to 100 Mbits/second. However, the third embodiment is different from the second embodiment except that another scheme which is standardized as IEEE 802.3u, i.e., a scheme which controls repeaters to prevent the repeaters from colliding with each other, is employed. In the above embodiment, the repeaters are not hierarchically arranged though they can be hierarchically arranged. The third embodiment shows a case wherein the repeaters are hierarchically arranged as shown in FIG. 8.

Nodes are not specially changed, and it is assume that ordinary nodes can be used. This is because various boards on the market can be used. Therefore, the repeaters are arranged such that the repeaters do not collide with each other.

FIG. 9 shows the structure of a first (#1) repeater 1 (a second (#2) repeater 31 has the same arrangement as that of the repeater 1).

The repeater (#1) is the same as an ordinary repeater. However, a repeater circuit portion of the repeater (#l) has a special function. The repeater (#1) is connected to an upper repeater 30 through a signal path 32, and is connected to lower nodes 2 and 3 through signal paths 6 and 7. An external signal input through transceivers (TR) 51, 52, and 53 is processed by the repeater (#1) to be converted into an electrical signal. A signal externally transmitted from the repeater (#1) is converted into a signal having a level and a shape which can externally transmit the electrical signal.

A repeater circuit (REP) 50 is connected to the transceivers 51, 52, and 53 through signal lines 54, 55, and 56. There are several types of connection to an external circuit on a standard. However, two independent signals for transmission and reception are typically employed. When a transmission speed is 100 Mbit/second, data having NRZI formation is encoded by a scheme called 4B5B.

In the demand priority scheme, transmission is controlled by a signal (having two priorities) whose transmission is requested by a node and a transmission enable signal. More specifically, the repeater permits a node which requests transmission by a priority and a round robin scheme.

However, there is no CSMA/CD scheme coping with a signal which is requested to be transmitted. However, when a carrier is detected, transmission is not performed. For this reason, a carrier is detected, and a signal which does not influence another signal is used as a transmission inhibit signal. For example, since a signal such as 11001100 which is obtained by repeating 11 and 00 can be easily generated, the signal can be used as a transmission inhibit signal. A signal formed of a repetition of 0101 like a preamble may be used as the transmission inhibit signal. In short, a carrier is preferably detected without being recognized as a frame.

In order to inhibit transmission, a carrier must be detected with respect to a target node within an interframe space time. Therefore, after the repeater transmits, e.g., a frame, to a node whose transmission is not inhibited, a transmission inhibit signal is transmitted half of the interframe space time after. More specifically, in order to inhibit transmission, not only a transmission inhibit signal is transmitted, but also the transmission inhibit signal must be transmitted within the interframe space time. For this reason, the repeater forms the signal and transmits it to a node whose transmission is inhibited within a predetermined period of time. A silence signal is used as a transmission enable signal. When this silence signal continues for the interframe space time or more, the silence signal serves as the transmission enable signal. When the ETHERNET of 100 Mbits/second is used, since the high-speed transmission can be performed, an idle signal is used in a non-transmission time between frames to obtain synchronization. This signal is the same as the silence signal which is not detected as a carrier.

Since it is known whether there is a transmission request, the repeater periodically gives a transmission enable signal to a certain node and gives a transmission inhibit signal to other nodes. As a result, all the nodes are periodically selected.

A node which obtains transmission right continuously transmits frames which are stored in the node to be transmitted at present. When the repeater receives the frame, the repeater switches a transmission inhibit signal to transmit the received frame to other nodes. In order to prevent the other nodes from colliding each other due to non-detection of a carrier while reception of the continuously received frames is stopped, the repeater transmits a transmission inhibit signal to nodes other than the transmission node a time shorter than an interframe gap after the frame is ended such that the other nodes detect the carrier.

When transmission is not performed a predetermined period of time after the transmission is completed, the repeater inhibits the node to transmit a signal, and the repeater permits the next node to transmit a signal.

Figure 10:
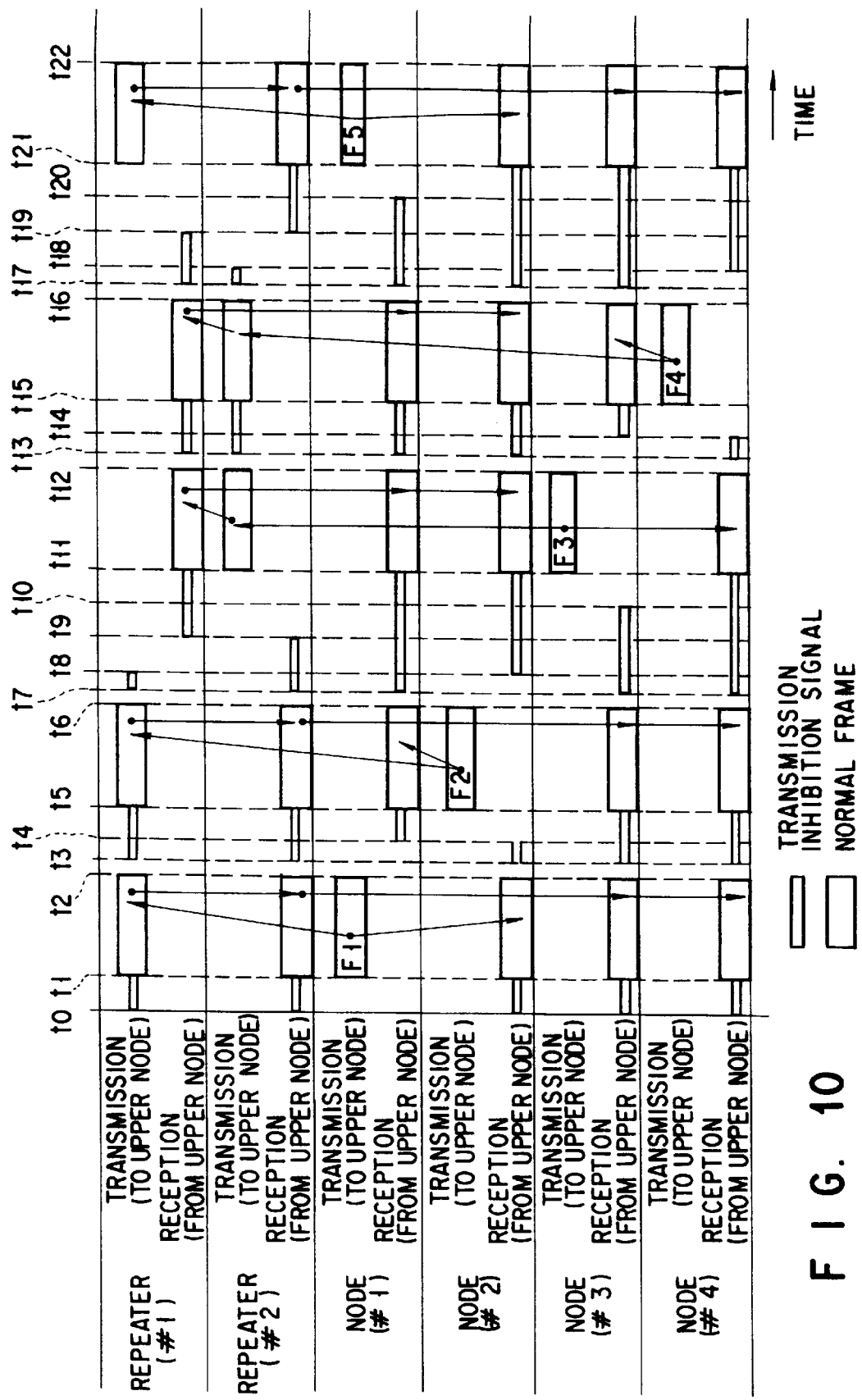
FIG. 10 is a timing chart of the third embodiment.

FIG. 10 shows a transmission state in this embodiment in which repeaters are hierarchically arranged to form two stages.

A repeater #1 controls nodes #1 and #2, and a repeater #2 controls nodes #3 and #4. These repeaters transmit/receive frames and control transmission right on the basis of a command from the upper repeater 30. The upper repeater 30 arranged upstream the repeaters #1 and #2 controls the lower repeaters #1 and #2 to transmit frames and control transmission right.

FIG. 10 shows a manner in which the nodes #1 to #4 or the repeaters #1 and #2 transmit frames to the upper nodes or repeaters and receive frames from the upper nodes or repeaters. For the sake of descriptive convenience, it is assumed that no delay occurs in the transmission paths, repeaters, or nodes. A case wherein delay occurs will be described later with reference to FIG. 11. Although no transmission enable signal is shown in FIG. 10, a state in which a signal other than a frame or a transmission inhibit signal is transmitted is a state in which a transmission enable signal is transmitted.

When the upper repeater 30 gives transmission permission to the repeater #1 at time t0, the repeater #1 receives a transmission enable signal from the upper repeater 30, and the repeater #2 receives the transmission inhibit signal. On the other hand, when the repeater #1 permits the node #1 to transmit a signal, the repeater #1 transmits a transmission enable signal to only the node #1 and transmits a transmission inhibit signal to all the other nodes #2 to #4. As a matter of course, the repeater #2 transmits a transmission inhibit signal to all the nodes.

At time t1 after the interframe space time or more has elapsed, the node #1 determines transmission permission to transmit a frame F1 to the repeater #1. This repeater #1 transmits the reception frame F1 to the node #2 in place of the transmission inhibit signal to transmit the frame F1 to the upper repeater 30. The repeater 30 transmits the reception frame F1 to the repeater #2 in place of the transmission inhibit signal, and, finally, the repeater #2 transmits the reception frame F1 to the nodes #3 and #4 in place of the transmission inhibit signal. In this manner, the frame F1 is transmitted to all the nodes.

At time t2, upon completion of transmission of the frame, a transmission inhibit signal is transmitted to nodes or repeaters other than the node #1 having transmission right at time t3 after a time shorter than the interframe space time has elapsed, as at time t0.

At time t4 after a time longer than the interframe space time from time t2, there is no transmission from the node #1. For this reason, the repeater #1 considers that the node #1 transfers transmission right, and transmission of the transmission inhibit signal to the node #2 serving as the next node is stopped, and the transmission inhibit signal is transmitted to the node #1 which has had transmission right.

At time t5 after a time longer than the interframe space time has elapsed from time t4, transmission of a frame F2 from the node #2 is started, and ended at time t6. At time t7, as at time t3, a transmission inhibit signal to nodes and repeaters which require the transmission inhibit signal. At time t8, an operation which is almost the same as the operation performed at time t4 is performed. More specifically, since transmission from the node #2 is not performed, the repeater #1 considers that the node #1 transfers transmission right, and the transmission inhibit signal is transmitted to the node #2 which has performed transmission. However, in the repeater #1, transmission right is circulated once. For this reason, transmission right is given to the node controlled by the next repeater #2, and transmission of the transmission inhibit single to the upper repeater 30 is stopped by the repeater #1.

At time t9 after a time longer than the interframe space time has elapsed from time t8, the repeater 30 can determine that transmission to the repeater #2 is permitted. For this reason, transmission from the repeater #2 to the repeater 30 is permitted. Therefore, transmission of a transmission inhibit signal to the repeater #2 is stopped. At the same time, transmission of the transmission inhibit signal to the repeater #1 is started. At time t10 after a time longer than the interframe space time has elapsed from time t9, the repeater #2 recognizes transmission permission, and stops transmission of transmission inhibit signal from the node #3 to wait for transmission from the node #3.

At time t11 after a time longer than the interframe space time has elapsed from time t10, the node #3 starts transmission of a frame F3. Since the sequential operation is the same as that described above, a description thereof will be omitted.

As described above, a frame interval used when the same node is continuously transmitted is the interframe space time as in an ordinary CSMA/CD scheme. When a node is changed, a time longer than one interframe space time is added. It is considered that a time corresponding to the number of intermediate repeaters which are required to transfer transmission right from the node to another node. Since the transmission right is transferred from the node #1 to the node #2 through the repeater #1, a time corresponding to one repeater is added. Since transmission right is transferred from the node #2 to node #3 through the repeater #1, the upper repeater 30, and the repeater #2, a time corresponding to three repeaters is added.

Figure 11:
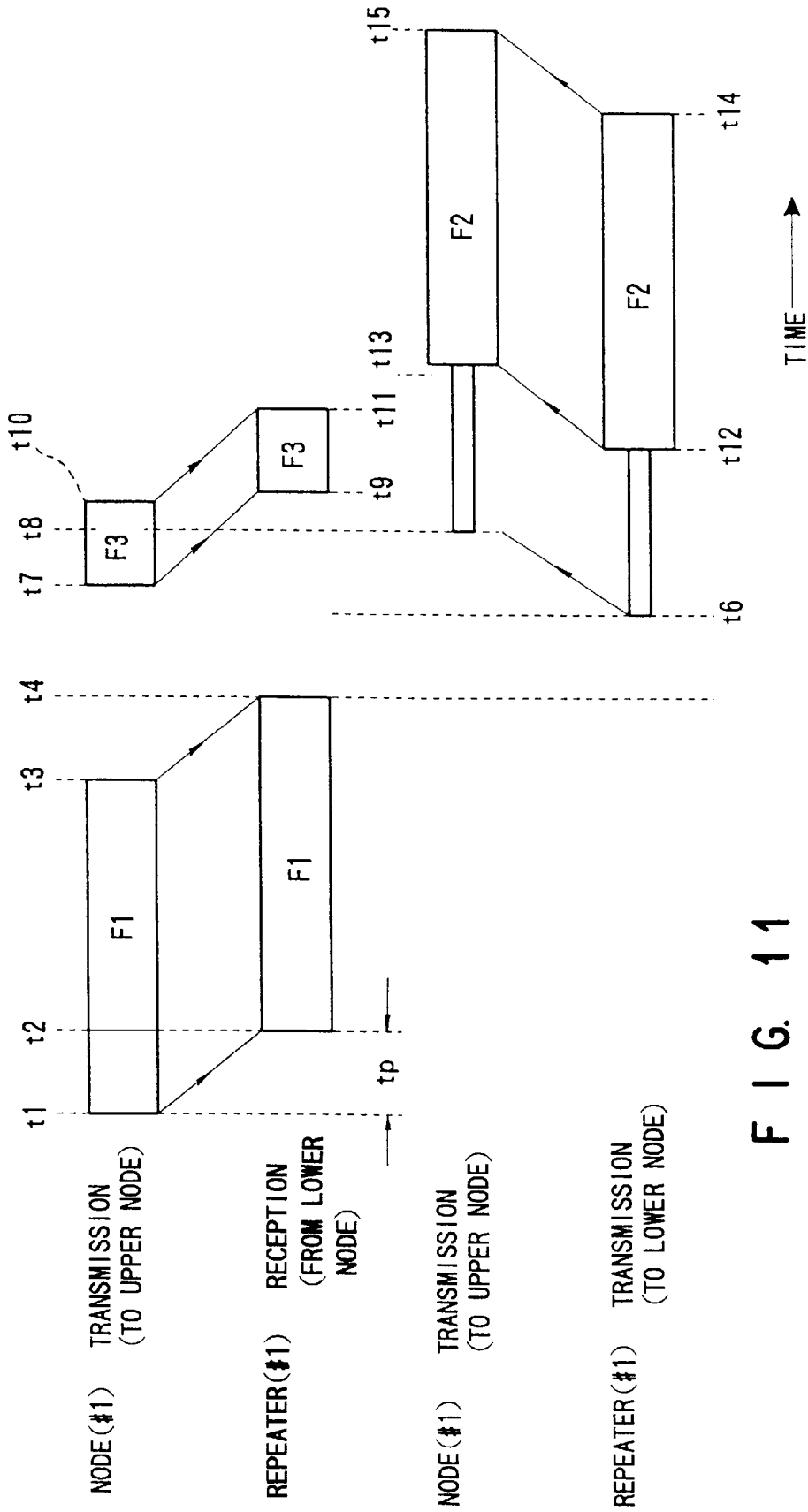
FIG. 11 is a timing chart of the third embodiment in consideration of avoidance of collision caused by transmission delay.

A transmission operation performed when delay occurs in transmission paths, repeaters, or nodes will be described below with reference to FIG. 11.

A case wherein transmission of the node #1 is completed to transfer transmission right to the node #2 will be considered below.

In a transition period in which transmission right is transferred from the node #1 to the node #2, it is assumed that a frame to be newly transmitted is generated before the node #1 recognizes that a transmission inhibit signal is received to transfer the transmission right. Although transmission of the node #1 is completed once, it is assumed that the node #1 restarts transmission.

When transmission is started in this state, a transmission inhibit signal output from the repeater #1 to the node #1 collides with a transmission frame transmitted from the node #1 to the repeater #1. Due to this collision, the transition frame generates a jamming signal to stop transmission. FIG. 11 shows such a transmission state.

The node #1 transmits a frame to the upper repeater #1 in a period from time t1 to time t3, and the repeater #1 receives the frame in a period from time t2 to time t4 a delay time after time t1. The repeater #1 waits for a time longer than the interframe space time to determine whether a new frame is transmitted from the node #1. When there are a plurality of transmission frames in a buffer for transmission, the node #1 transmits the remaining frame to the interframe space time after. In this case, since there is no remaining frame, at time t6 after a time longer than the interframe space time has elapsed, the repeater #1 starts transmission of a transmission inhibit signal to the node #1. The transmission inhibit signal reaches the node #1 at time t8.

In the node #1, there is no frame to be transmitted at time t3. However, at this time, transmission can be performed at time t7 even in formation of the transmission frame. At this time (time t7), since no transmission inhibit signal from the repeater reaches the node #1, the node #1 starts transmission at time t7. However, collision is detected at time t8, and a jamming signal is generated to stop transmission at time t10. This frame is received by the repeater #1 in a period from time t9 to time t11. This frame is a small frame which is smaller than 512 bits which is the minimum size, and is a small frame which is formed when collision occurs at the start of the frame. Since the repeater #1 permits the node #2 to transmit a frame, when the repeater #1 receives a frame from the node #2, the frame is transmitted in a period from time t12 to time t14 in place of a transmission inhibit signal, and the node #1 receives the frame in a period from time t13 to t15.

A frame which cannot be transmitted due to collision is transmitted when transmission right is received by the node #1. In transmission after collision occurs, a backoff algorithm is employed.

In this embodiment, in the first transmission after the first collision, a time which is 0 or 1 time a slot time is selected (selected by pseudoly throwing a dice in a media access controller). After the selection slot time has elapsed, the above frame is transmitted. On the other hand, a node is selected, the node is selected in at least the slot time. In this manner, even in a case wherein the collision occurs, transmission can be performed without any problem.

The collision occurs when transmission is to be performed again immediately after the node aborts transmission right. However, this operation is performed only when the software of the node is programmed to perform the operation. More specifically, in the middle of transmission of the node #1, when the next transmission request is generated by the node #1, and re-transmission is permitted a predetermined period of time after the present transmission is completed, collision can be prevented.

There is a case wherein another collision may occur. This case is a case wherein, when the node continuously transmits frames, the repeater transmits a transmission inhibit signal to a node to forcibly stop transmission. Before the transmission inhibit signal receives the node, the node is permitted to transmit the frame, and the frame is transmitted, thereby causing a collision to occur. As the distance increases, the collision occurs due to time limitation. Since time limitation in an ETHERNET of 100 Mbits/second is larger than that in an ETHERNET of 10 Mbits/second, collision easily occurs.

When conditions under which a collision occurs are set, in a selection time of a node, control is performed such that the node is selected in at least the slot time. When transmission control is performed as described above, only the first collision occurs, and a collision caused by a backoff algorithm does not occur a plurality of times. For this reason, transmission is not delayed.

A transmission operation including a collision avoiding operation by the repeater circuit 50 will be described below with reference to the flow charts in FIGS. 12 and 13.

The repeater circuit 50 monitors whether a transmission enable signal is received from an upper repeater in step P1. When the transmission enable signal continues for a predetermined time T3 or more, transmission is permitted. For this reason, the repeater receives transmission right (step P2). The above steps are omitted in the flow chart.

The repeater circuit 50 performs different operations depending whether the repeater circuit 50 has transmission right. For this reason, in step Al, it is determined whether the repeater circuit 50 has transmission right. When the repeater circuit 50 has no transmission right, a reception data from the upper repeater is transmitted to a lower node (step A2). When the repeater circuit 50 has transmission right, a node number "i" of the lower node is initialized (i=1) (step B1), and transmission right is given to the node having the node number "i" (step C2). A transmission enable signal is transmitted to a node "i", and a transmission inhibit signal to other nodes and the upper repeater (step C3).

In this case, the transmission inhibit signal is a signal which is transmitted within a time T1 (e.g., half of the interframe space time) shorter than the interframe space time from the previous frame end, and is a signal in which carrier detection is performed. The repeater circuit 50 comprises a timer means for measuring the time T1.

The repeater circuit 50 determines whether a frame can be received within a predetermined time T2 from the node "i" which gives transmission right (step C4). When the frame can be received within the predetermined time T2, the frame is transmitted to other nodes or the upper repeater in place of the transmission inhibit signal (step C5). The predetermined time T2 is set to have a length which is almost equal to that of the interframe space time.

In the process of the step C4, when no frame is received within the predetermined time T2, it is determined that the node "i" does not require transmission right. The node number "i" is incremented by 1, transmission right is transferred to the next node (step D1). At this time, when all the nodes are completed (step D2), if the repeater is not a root repeater which is the lowermost repeater (step D3), the transmission right of the repeater is transferred to the next repeater (step D4), the process is shifted to step A1. If the repeater is a root repeater, the process is shifted to step B1, the node number is initialized, and the above process is repeated.

In this manner, when the repeater circuit 50 obtained from transmission right from the upper repeater, the repeater circuit 50 sequentially selects lower nodes, receives a transmission frame from the lower nodes, and transmits the transmission frame to the other nodes and the upper repeater. For this reason, the repeater circuit 50 has a frame reception/transmission function, a node selection function, a function of transmitting a transmission inhibit signal, a function of transmitting a transmission enable signal, a function of detecting non-reception of a frame for transferring transmission right, and a function of receiving a transmission enable signal for receiving transmission right of a repeater.

In this manner, according to this embodiment, as a node, a node using a CSMA/CD scheme is used. Unlike the CSMA/CD scheme, as a repeater, a repeater using a round robin scheme which performs control such that sequentially gives transmission right is used. For this reason, the following effects can be obtained.

(1) Transmission is not delayed due to continuous collision, and a desired transmission cycle of control data is not extended. Therefore, a high-speed operation can be obtained, and transmission efficiency is high.

(2) For a backoff process of collision, a frame must be reciprocated within a predetermined slot time. For this reason, the interval between nodes must have a distance of 210 meters or less in the 100-Mbits ETHERNET. This distance is shorter than the distance of a 10-Mbits ETHERNET, i.e., 2,500 meters. A long distance is required in a plant, at least a distance of about 2,500 meters which is equal to that of the 10-Mbits ETHERNET is required. In this embodiment, since a backoff process is not repeated, the distance in the 100-Mbits ETHERNET is not limited to 210 meters.

(3) As a repeater, a special repeater for realizing the scheme of this embodiment is required. A node used in a general ETHERNET can be used without being changed. Therefore, the node need not be newly designed and developed, software can be used without being changed, and software and hardware resources can be effectively used.

The above describes a scheme in which transmission is permitted until a frame transmitted to the node is eliminated. In this scheme, when many message data to be transmitted are accidentally present, one cycle of the node is prolonged, and the transmission cycle of control data is prolonged. Another scheme for removing this drawback will be described below. In this scheme, when the maximum time which is predetermined by measuring a time in which the node holds transmission right has elapsed, transmission of the node is stopped, and the next node is selected.

This scheme can be realized such that the block shown in FIG. 14 is inserted between step B1 and step C2 of the flow chart in FIG. 12. Step C1 for checking whether the occupation time of the node "i" exceeds a maximum occupation time T4 is set to prevent the time of one cycle from being excessively long. A means for measuring the occupation time of the node is added to the repeater circuit 50, and a means for comparing the occupation time with a predetermined set time must be arranged.

According to the above scheme, when the maximum occupation time of the node is regulated and controlled, the following drawbacks can be prevented. That is, only one node occupies a transmission path to delay transmission of another node, and the entire transmission cycle is extended.

The above has exemplified the ETHERNET frame as a frame. However, in a formation called SNAP, an ETHERNET frame is set on a frame of IEEE 802.3. This is standardized by RFC1042. In some apparatus such as a known work station, a TCP/IP protocol can be processed in either of an original ETHERNET formation or IEEE 802.3 formation. Therefore, the scheme described in this embodiment can include both the formations as an ETHERNET frame.

As a repeater, a repeater having a switching function can be used. This is effective when unicasting is performed.

(Fourth Embodiment)

In the networks described above, only one node can transmit at once. This is not insufficient as a transmission capacity when a network increases in size. In the large network, the network is divided into a plurality of parts to make it possible to simultaneously transmit frames from a plurality of nodes, an integrating mechanism which can mutually transmit necessary information is required.

This embodiment describes a network in which a plurality of networks are hierarchically integrated to mutually transmit necessary information.

FIG. 15 shows a network arrangement in this embodiment. A bridge repeater (BR1) 40 and a bridge repeater (BR2) 41 function as root repeaters of independent networks to control nodes 2 to 5 (or repeaters), thereby performing transmission. On the other hand, an uppermost root repeater 30 regards the bridge repeaters 40 and 41 as nodes independently of the lower repeaters to control transmission.

The bridge repeaters BR1 and BR2 have functions of a repeater and a node. The bridge repeaters BR1 and BR2 further function as bridges to have functions of exchanging control data with a message between upper and lower nodes.

With respect to a message, a frame from a lower node to be transmitted to an upper node is transmitted such that the bridge repeaters BR1 and BR2 check the destination of the header. Frame transmission from the upper node to the lower node is performed in the same manner as described above. A repeater 30 and the nodes 2 to 5 which are elements other than the bridge repeaters have the same arrangements as those in the above embodiment.

With respect to control data, transmission is independently performed by the upper and lower nodes, a selected one of the upper and lower data is transmitted from the upper node to the lower node or vice versa.

FIG. 17 shows a data map expressing the above manner. "A" is added to the head of control data of the bridge repeater (BR1) 40, and "B" is added to control data of the bridge repeater (BR2) 41. High speed control data transmitted/received between the bridge repeater BR1 and the upper repeater 30 are represented by A-H1 and A-H3; low speed control data is represented by A-L1; high speed control data transmitted/received between the bridge repeater BR2 and the upper repeater 30 are represented by B-H1 and B-H3; and low speed control data is represented by B-L1. These data are part of control data handled in the bridge repeaters. More specifically, only necessary data are transmitted/received between the bridge repeaters and the upper repeater.

The root repeater 30 manages control data in accordance with a memory map shown in FIG. 17. The control data A-H1 and B-H1 partially overlap each other on the root repeater 30. More specifically, part of the control data A-H1 is transmitted to the bridge repeater BR2 as the data B-H1. Similarly, part of the data A-H3 and A-L1 is transmitted to the bridge repeater BR2 as data of the data B-H3 and B-L1.

Note that high speed control data in a lower node is not always high speed control data in an upper node. More specifically, a speed required in another network is employed. In the bridge repeaters BR1 and BR2, when data is to be transmitted to the upper node, after an address is converted into an upper address, transmission is performed. In reception, after an address is converted into a lower address, reception is performed. The received data is transmitted to the entire lower network. Data transmitted to the upper node is data received by a bridge repeater from the lower network.

FIG. 16 shows the arrangement of the bridge repeater BR1. The bridge repeater BR2 has the same arrangement as that of the bridge repeater BR1.

The bridge repeater BR1 has an arrangement obtained by combining a repeater and a node. Therefore, the node does not receive data from a host system, but receives data from the repeater, and the data received by the node is not transmitted to the host system, but is transmitted to the repeater. The data mutually transmitted/received is stored in a control data memory 16 as in an ordinary node.

When control data is to be transmitted, a CPU 14 performs address conversion described above to control transmission/reception of the upper and lower data. When message data is used, a message from a lower node is temporarily stored in the control data memory 16. The CPU 14 determines on the basis of a destination address whether the message is to be transmitted to the upper node. The message to be transmitted is transmitted to the upper node. When the message is to be transmitted to the lower node, a frame from the upper node is temporarily received, and it is determined on the basis of a destination address whether the frame is to be transmitted to the lower node as a bridge. The frame to be transmitted to the lower node through the repeater circuit 50.

In short, only message data which is required as a bridge is transmitted to the upper or lower node, and only control data which is required by the control data memory is selectively transmitted to the upper or lower node. If a single network is used, only one frame can be transmitted at once. For this reason, a long time is required to transmit all the data. When the network is divided as described above, a plurality of data can be transmitted at once, and only necessary data are transmitted/received between the divided networks. Therefore, a system having high efficiency can be constituted as a whole. The types of the divided networks may have only performance required by the networks. For this reason, for example, a lower node has a repeater of the round robin scheme in 10-Mbits CSMA/CD scheme, and an upper node has the demand priority scheme.

The above frame has been described as an ETHERNET frame. However, in a formation called SNAP, an ETHERNET frame is set on a frame of IEEE 802.3 as described above. In some apparatus such as a known work station, a TCP/IP protocol can be processed in either of an original ETHERNET formation or IEEE 802.3 formation. Therefore, the scheme described in this embodiment can include both the formations as an ETHERNET frame.

As described above, according to this embodiment, since a network is divided, a plurality of data can be transmitted at once, and transmission efficiency can be improved. In particular, the transmission cycle of control data can be shortened.

According to this embodiment, the memory amount of control data can be minimized in comparison with a single network is used.

According to this embodiment, a scheme which is optimum for divided networks can be selected.

As has been described above, according to the present invention, the following effects can be obtained.

(1) Each node comprises a control data memory, and each node multicasts control data to share the control data. For this reason, the same data need not be transmitted to the plurality of nodes, respectively, and a time required for transmission can be shortened.

(2) A host system or the like directly connected to the node can access the latest control data without lag.

(3) Since each node multicasts repeated control data, if a signal erroneously operates by external noise to prevent transmission from being normally performed, re-transmission is automatically performed.

(4) A frame of the ETHERNET serving as a defacto standard is directly used, and transmission is performed. For this reason, known enormous software can be used, and development cost can be decreased. High opening properties can be obtained.

(5) Since control data is transmitted on the UDP, the control data can be easily constituted on the known TCP/IP. When the transmission amount of the control data is small, special hardware is not necessary.

(6) The priority of control data is set to be high, and the priority of message data is set to be low. In this manner, the control data can be reliably transmitted in a predetermined cycle. On the other hand, since the message data can be transmitted by effectively using an idle transmission path, the message data can be rapidly transmitted.

(7) When a token is lost for some reason, transmission can be always performed in the CSMA/CD scheme. For this reason, the token can be easily recovered within a short time in comparison with recovering of a token in a token bus scheme.

(8) Transmission is performed by the CSMA/CD scheme, and transmission right of a repeater and a node is controlled by using a transmission inhibit signal. For this reason, continuous collision can be prevented, and control data can be reliably transmitted within a desired transmission cycle.

(9) Since the maximum occupation time of the node is regulated and controlled, the following drawbacks can be prevented. That is, only one node occupies a transmission path to delay transmission of another node, and the entire transmission cycle is extended.

(10) Since a network is divided, a plurality of data can be transmitted at once, and transmission efficiency can be improved. In particular, the transmission cycle of control data can be shortened.

(11) A transferring mechanism of control data which functions as a simple DMA controller can be constituted by hardware. For this reason, when a large number of control data are present, highly efficient processing can be performed.

(12) Although a transmission delay time required by control changes depending on control data, a control data transmission cycle suitable for the transmission delay time can be selected. Transmission paths can be effectively used without worthlessly transmitting data whose transmission delay time may be large many times.

The present invention is not limited to the above embodiments, various modification can be realized. For example, although the embodiments are independently described above, a plurality of embodiments may be properly combined to each other.

What is claimed is:

1. A data transmission system used for a plant control system, the data transmission system comprising:
   nodes; and
   at least one repeater connected to said nodes;
   each node transmitting control data used for controlling a plant and message data used for a man/machine interface to another node, and each node comprising:
      a control data memory for storing the control data;
      means for forming a control frame of the control data and a message frame of the message data according to IEEE 802.12 standard; and
      means for periodically transmitting the control frame in a multicast manner and the message frame in a unicast manner.

2. The data transmission system according to claim 1, wherein
   said repeater processes the control frame at a high priority, and processes the message frame at a low priority.

3. A data transmission system used for a plant control system, the data transmission system comprising:
   nodes; and
   at least one repeater connected to said nodes;
   each node transmitting control data used for controlling a plant and message data used for a man/machine interface to another node, and comprising::
      a control data memory for storing the control data;
      means for forming a control frame of the control data and a message frame of the message data according to IEEE 802.3u standard; and
      means for transmitting the control frame and the message frame by a CSMA/CD scheme, and wherein
   a token is circulated between said nodes to give transmission right to one of said nodes; and
   a permissible time in which the token is held by a node to hold present transmission right is determined one the basis of time at which the node obtains a previous transmission right.

4. A data transmission system used for a plant control system, the data transmission system comprising:
   nodes; and
   at least one repeater connected to said nodes;
   each node transmitting control data used for controlling a plant and message data used for a man/machine interface to another node, and comprising:
      a control data memory for storing the control data;
      means for forming a control frame of the control data and a message frame of the message data according to IEEE 802.3u standard; and
      means for transmitting the control frame and the message frame by a CSMA/CD scheme, and
   said at least one repeater comprising an upper repeater and a lower repeater which are hierarchically arranged,
   a transmission inhibit signal being transmitted from the upper repeater to the lower repeater to control transmission right between said upper and lower repeaters and the transmission inhibit signal being further transmitted from said lower repeater to said nodes to control transmission right between said nodes.

5. The data transmission system according to claim 4, wherein
   said lower repeater measures a time period during which each node has the transmission right; and
   when the measured time exceeds a predetermined time, transmission of a next frame is forcibly inhibited by a transmission inhibit signal and the transmission right is shifted to another node.

6. The data transmission system according to claim 1, wherein
   the data transmission system is divided into a plurality of sub-networks;
   the sub-networks are connected to bridge repeaters which are then connected to repeaters;
   the bridge repeater comprises a control data memory used for transmitting/receiving the control frame and the message frame.

7. The data transmission system according to claim 6, wherein said bridge repeater determines a destination indicated at a frame header of the message frame received from an upper or lower node, transmits only necessary message data to said upper or lower node, and transmits only necessary control data from the control frame stored in said control data memory to said upper or lower repeater.

8. The data transmission system according to claim 1, wherein the nodes comprises:
   a register for storing a block type indicating a total number of blocks of the control data forming the control frame and a size of one block;
   a counter for storing a block start address, and designating a read address of said control data memory;
   a comparator for comparing a counter value of said counter with the block type to read a desired block; and
   another comparator for comparing the number of blocks read from said control data memory with the total number of blocks to detect that all the blocks are transmitted.

9. The data transmission system according to claim 1, wherein the nodes comprises:
   a register for storing a block type indicating a total number of blocks items of the control data forming the control frame and a size of one block which are extracted from the control frame received by said node;
   a counter for storing a block start address extracted from the control frame, and designating a write address of said control data memory of said node;
   a comparator for comparing a counter value of said counter with the block type to write a desired block; and
   another comparator for comparing the number of blocks written in said control data memory with the total number of blocks to detect that all the blocks are written.

10. The data transmission system according to claim 1, wherein:
    the control frame is classified into a high speed control frame and a low speed control frame whose transmission cycles are different from each other;
    the high speed control frame is transmitted within a first transmission cycle; and
    the low speed control frame is transmitted within a second transmission cycle which is an integer times longer than the first transmission cycle.

11. A data transmission system used for a plant control system, the data transmission system comprising at least one repeater and nodes transmitting control data used for controlling a plant and message data used for a man/machine interface, in which when a given node having a transmission right given from the repeater transmits data of one frame, the transmission right is shifted to another node which requests transmission to the repeater, a node is allowed to transmit data with a high priority when a transmission request has a high priority, and each node is equally allowed to transmit data when the transmission requests have the same priority, and in which each node comprises:

means for forming a control frame of the control data and a message frame of the message data according to the IEEE 802.12 standard;

means for periodically transmitting the control frame in a multicast manner and transmitting the message frame in a unicast manner; and a control data memory for storing the control data; and said repeater comprises means for processing the control frame with a high priority and the message frame with a low priority.

12. A data transmission system used for a plant control system, the data transmission system comprising at least one repeater and nodes transmitting control data used for controlling a plant and message data used for a man/machine interface based on a CSMA/CD scheme, in which each node comprises:

means for forming a control frame of the control data, a message frame of the message data, and a token frame for indicating a transmission right according to the IEEE 802.3u standard;

means, upon receipt of the token frame and having a transmission right, for storing a time at which the token frame is received and transmitting the control frame in a multicast manner;

means, while the control frame is transmitted, for setting an allowable transmission period for holding the present transmission right based on the time at which the previous token frame is received, and transmitting the message frames and the token frame until the allowable transmission period is expired;

means for transmitting and receiving the control frame by using a control data memory.

13. A data transmission system used for a plant control system, the data transmission system comprising at least one repeater and node transmitting control data used for controlling a plant and message data used for a man/machine interface based on a CSMA/CD scheme, in which each node comprises:

means for forming a control frame of the control data, a message frame of the message data, and a token frame for indicating a transmission right according to the IEEE 802.3u standard;

means for transmitting the control frame with a high priority and the message frame with a low priority to a given repeater upon receipt of a transmission enable signal from the given repeater; and means for transmitting and receiving the control frame by using a control data memory, and said repeater comprising:

means for cyclically giving a transmission enable signal to one node and a transmission inhibit signal to other nodes;

means, upon receipt of the frame from a given node, for transmitting the received frame instead of the transmission inhibit signal to the other nodes;

means, upon not receiving the frame from the given node within a predetermined time period, for switching the transmission enable signal to the transmission inhibit signal and for transmitting the transmission enable signal to one of the other nodes.

14. The data transmission system according to any one of claims 11 to 13, in which said control data memory stores a block type indicating a size of a block of the control data, a total number of blocks forming one frame, and a start address of the block; and said node reads the control data of one block from the control data memory by using the start address and an output from an address counter for generating addresses for one block based on the block type as a read address and transfers the read control data to a buffer memory, the node forming the control frame with a frame header, the block type, the total number of blocks, and the control data stored in the buffer memory when the number of blocks transferred to the buffer memory is equal to the total number of blocks.

15. The data transmission system according to any one of claims 11 to 13, in which a transmitting node forms the control frame with a block type indicating a size of a block of the control data, a total number of blocks forming one control frame, a start addresses of the blocks, and the block of the control data, and cyclically transmits the control frame in a multicast manner; and a receiving node reads the block type and the start address for each block, stores the block of the control data to the control data memory by changing an address from the start address to an end address which is determined by the block type, and terminates storing of the control data when the number of the blocks of the stored control data is equal to the total number of the blocks.

* * * * *